Dec. 27, 1949         H. SCHRADER         2,492,894

CAN ARRANGING AND BAGGING APPARATUS

Filed Aug. 3, 1948                                      14 Sheets-Sheet 1

INVENTOR
Herbert Schrader
BY Mason, Porter, Diller & Stewart
ATTY'S

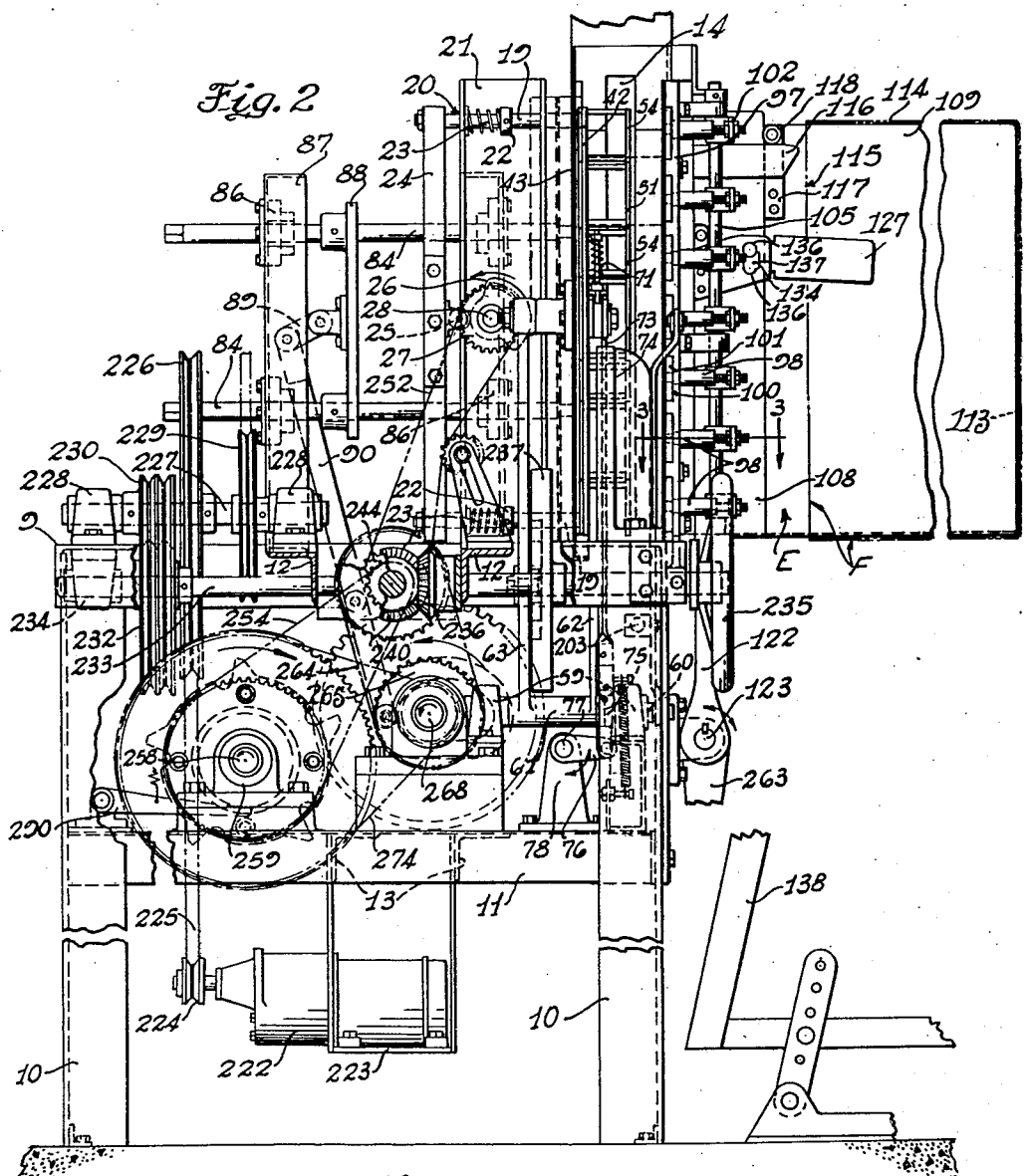
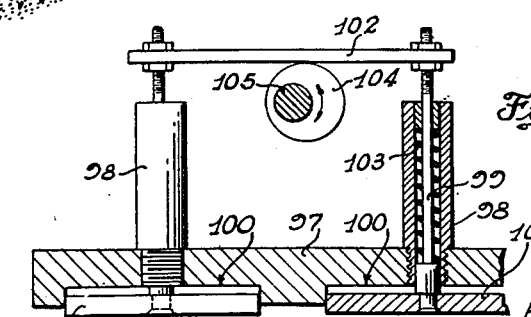

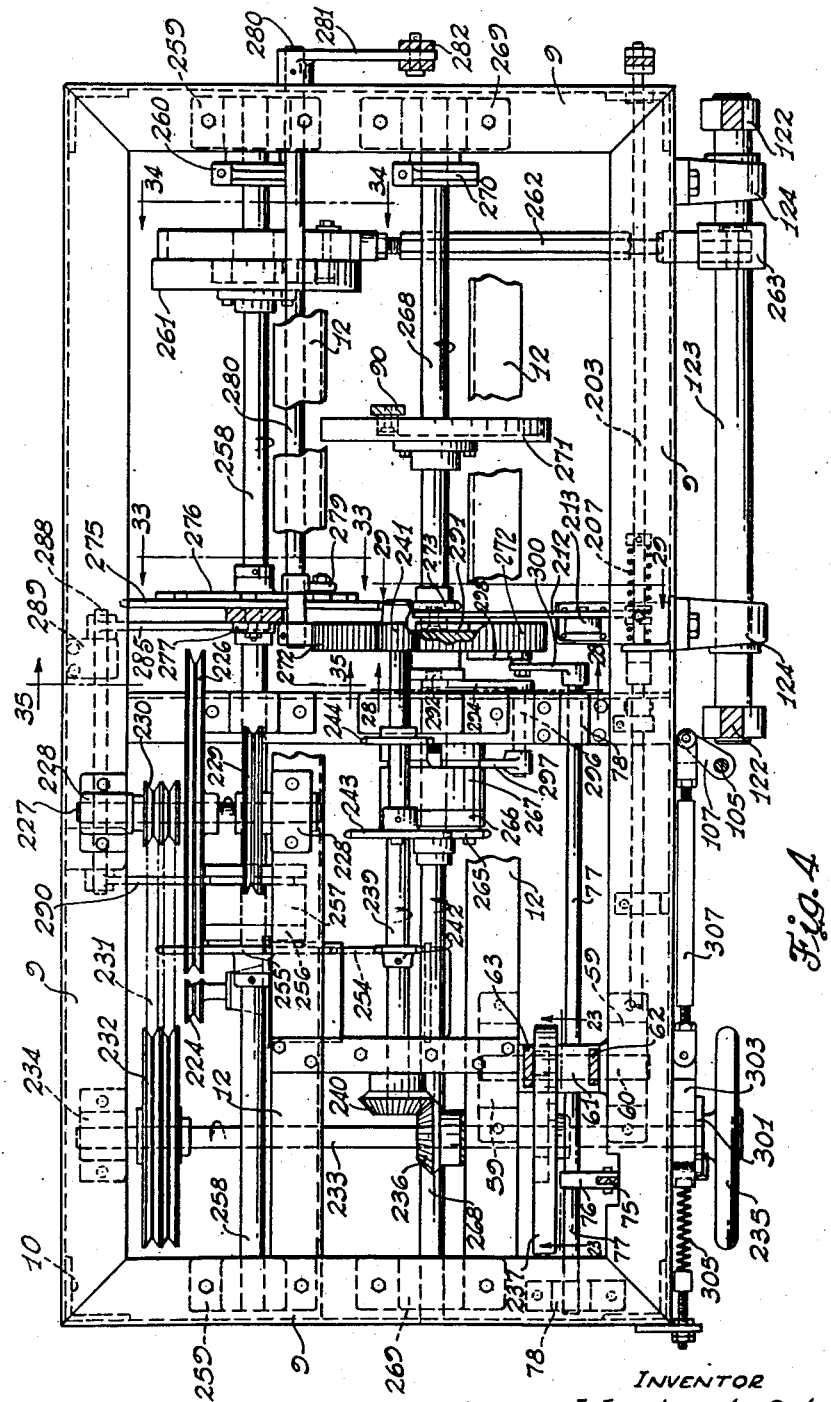

Dec. 27, 1949     H. SCHRADER     2,492,894
CAN ARRANGING AND BAGGING APPARATUS
Filed Aug. 3, 1948     14 Sheets-Sheet 4
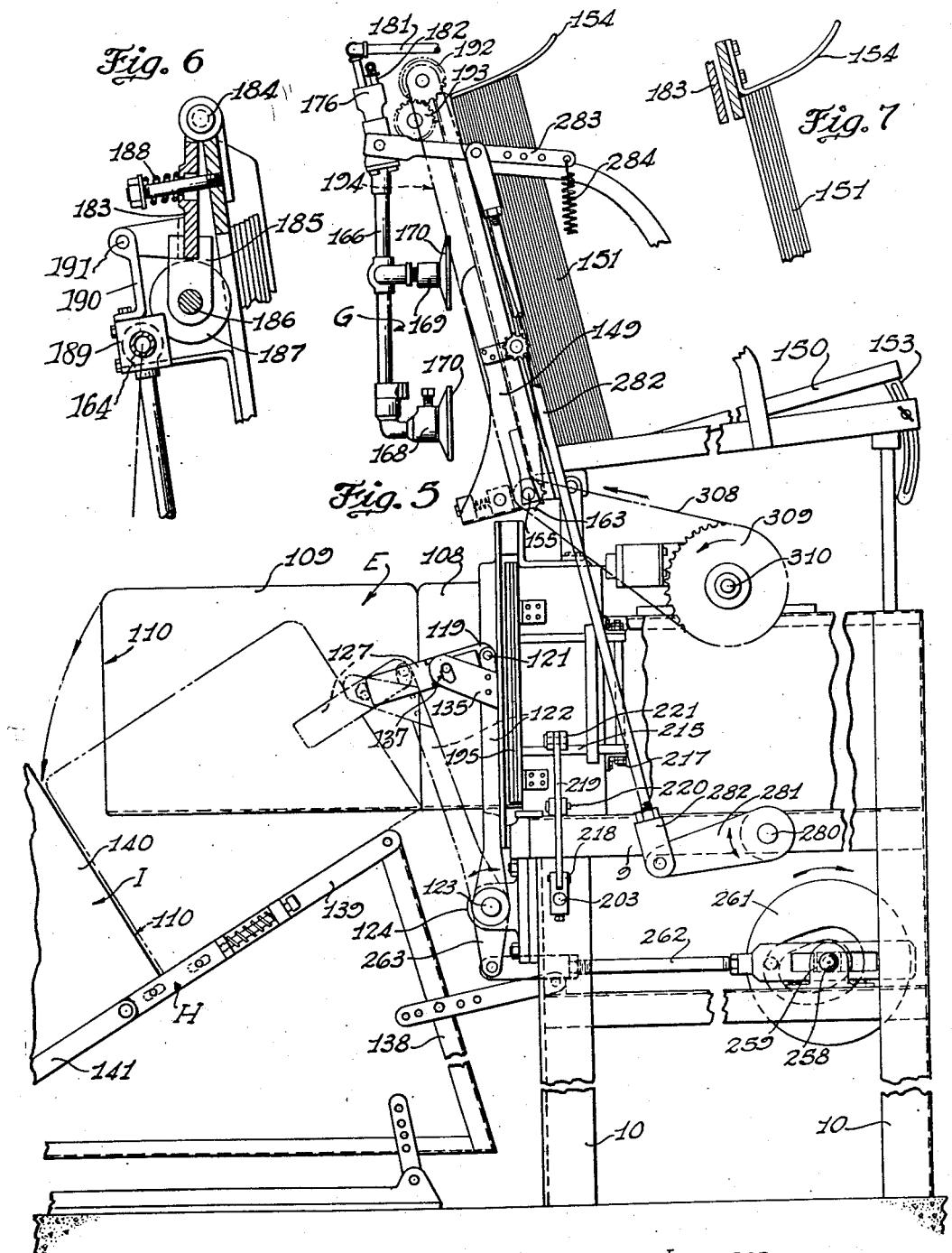
INVENTOR
Herbert Schrader
By Mason, Porter, Diller & Stewart
ATTY'S.

Dec. 27, 1949 H. SCHRADER 2,492,894
CAN ARRANGING AND BAGGING APPARATUS
Filed Aug. 3, 1948 14 Sheets-Sheet 5

INVENTOR
Herbert Schrader
BY Meun, Porter, Diller & Stewart
ATTYS.

Dec. 27, 1949     H. SCHRADER     2,492,894
CAN ARRANGING AND BAGGING APPARATUS
Filed Aug. 3, 1948     14 Sheets-Sheet 6
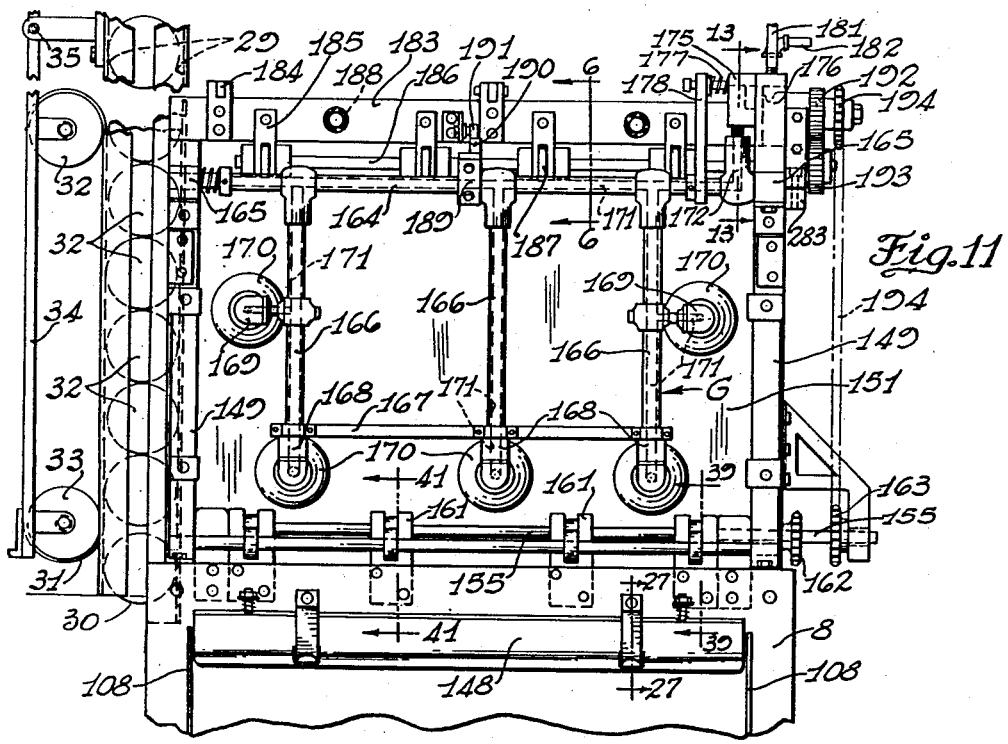
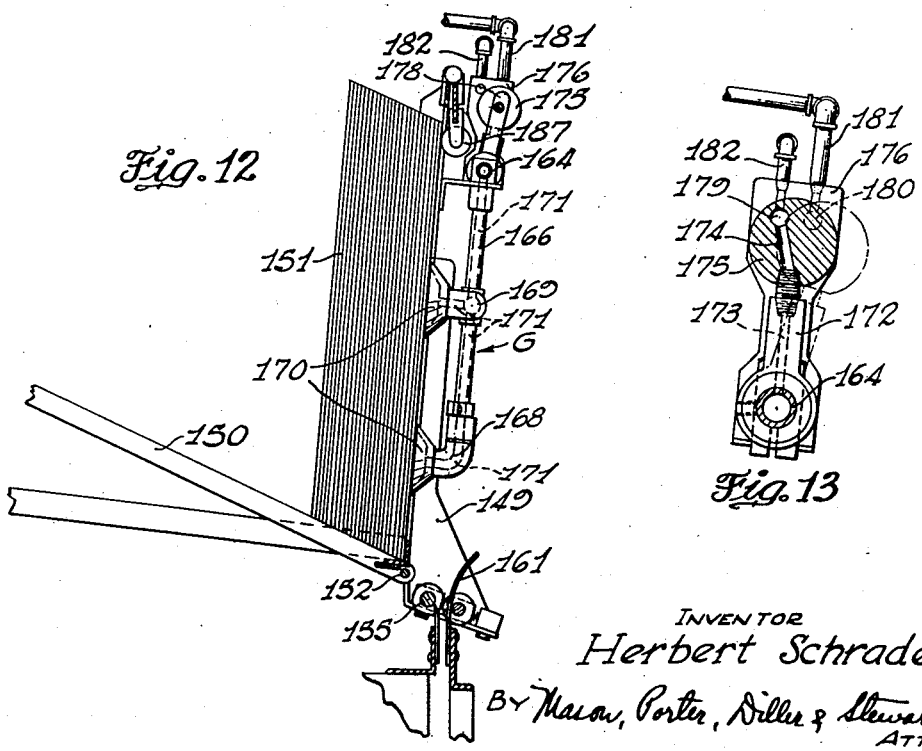
INVENTOR
Herbert Schrader
By Mason, Porter, Diller & Stewart
ATTY'S.

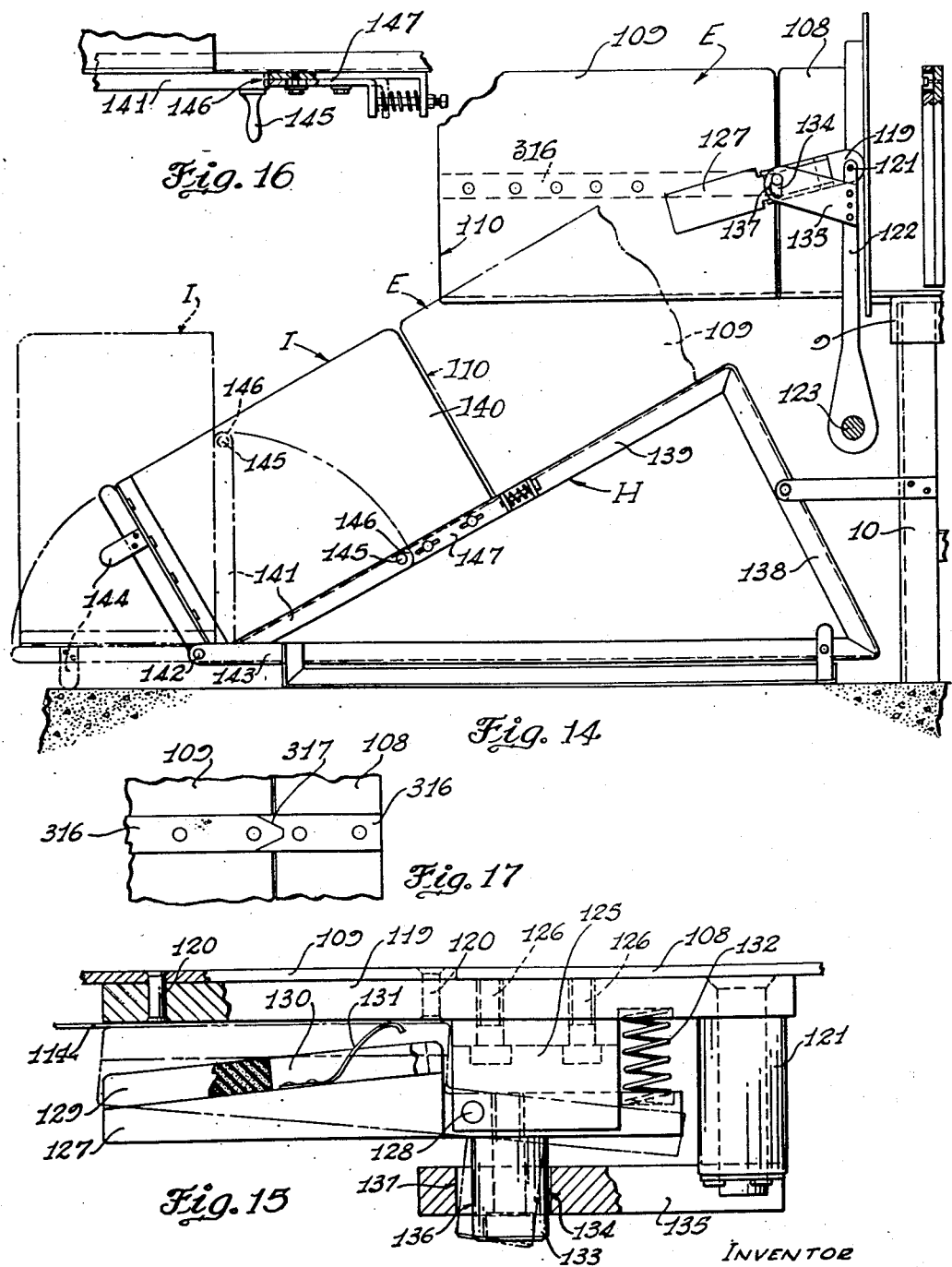

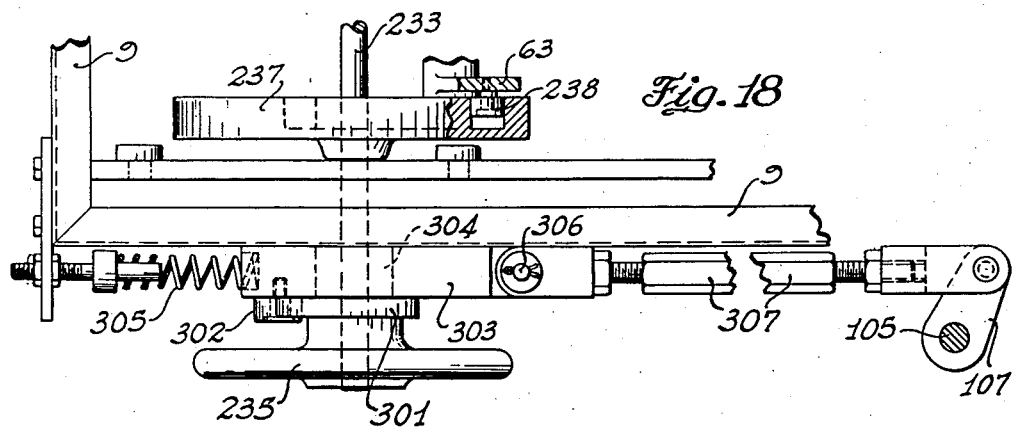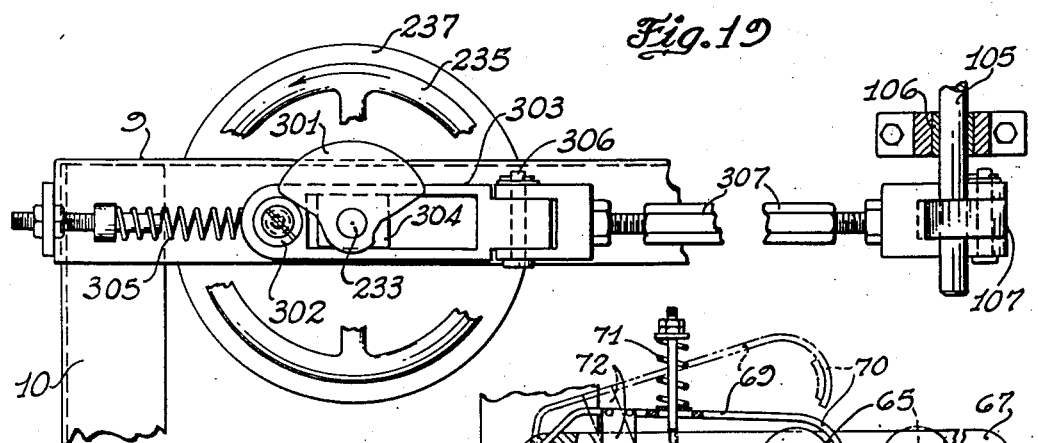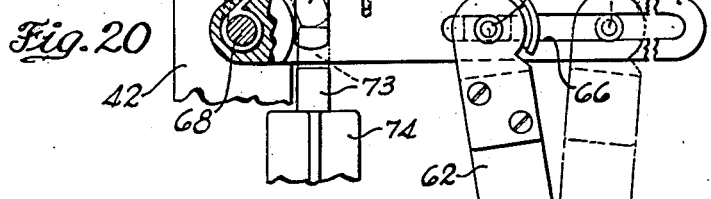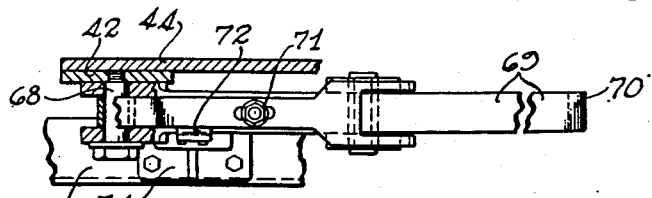

Dec. 27, 1949         H. SCHRADER         2,492,894
CAN ARRANGING AND BAGGING APPARATUS
Filed Aug. 3, 1948         14 Sheets-Sheet 9
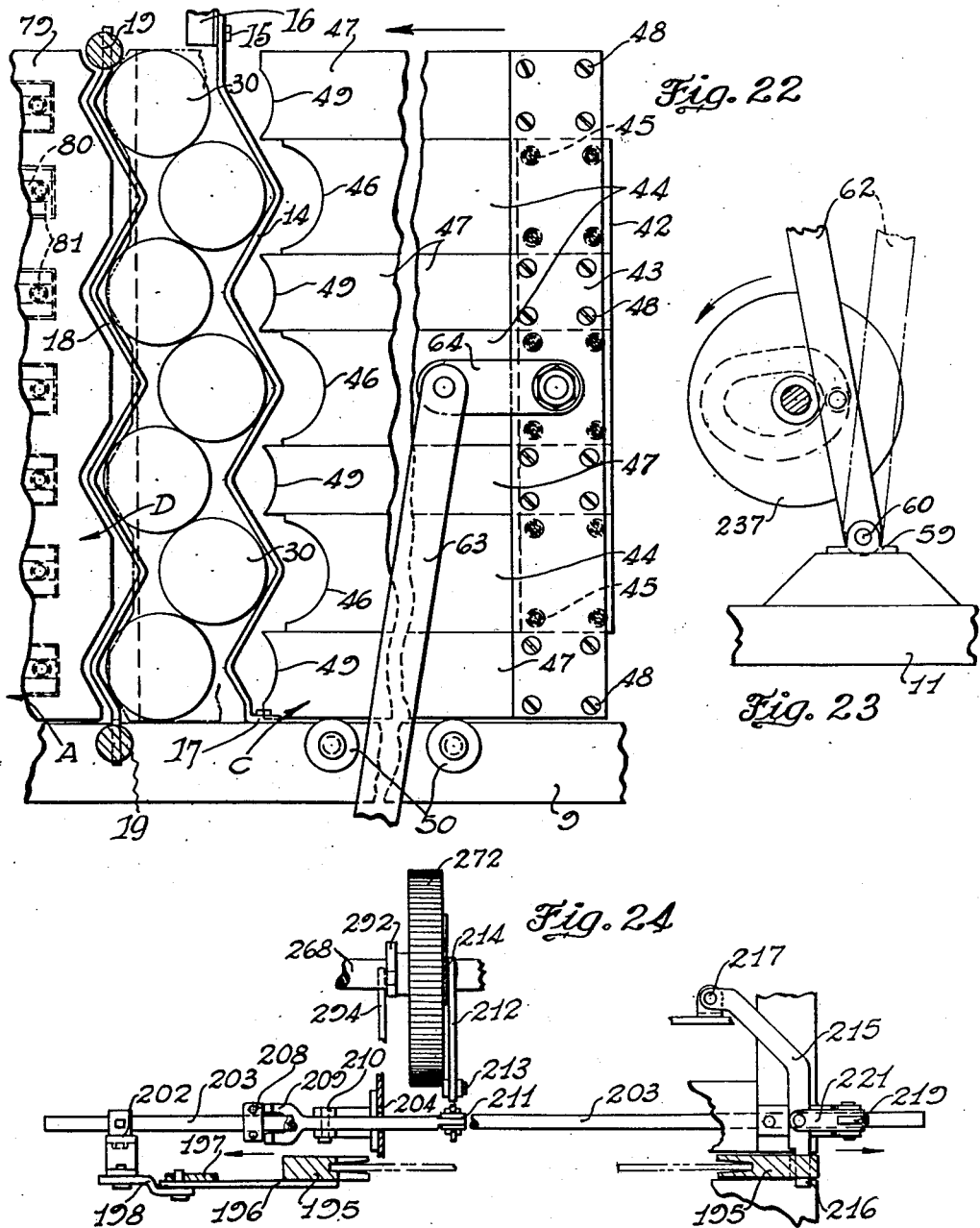
INVENTOR
Herbert Schrader
By Mason, Porter, Diller & Stewart
ATTY'S.

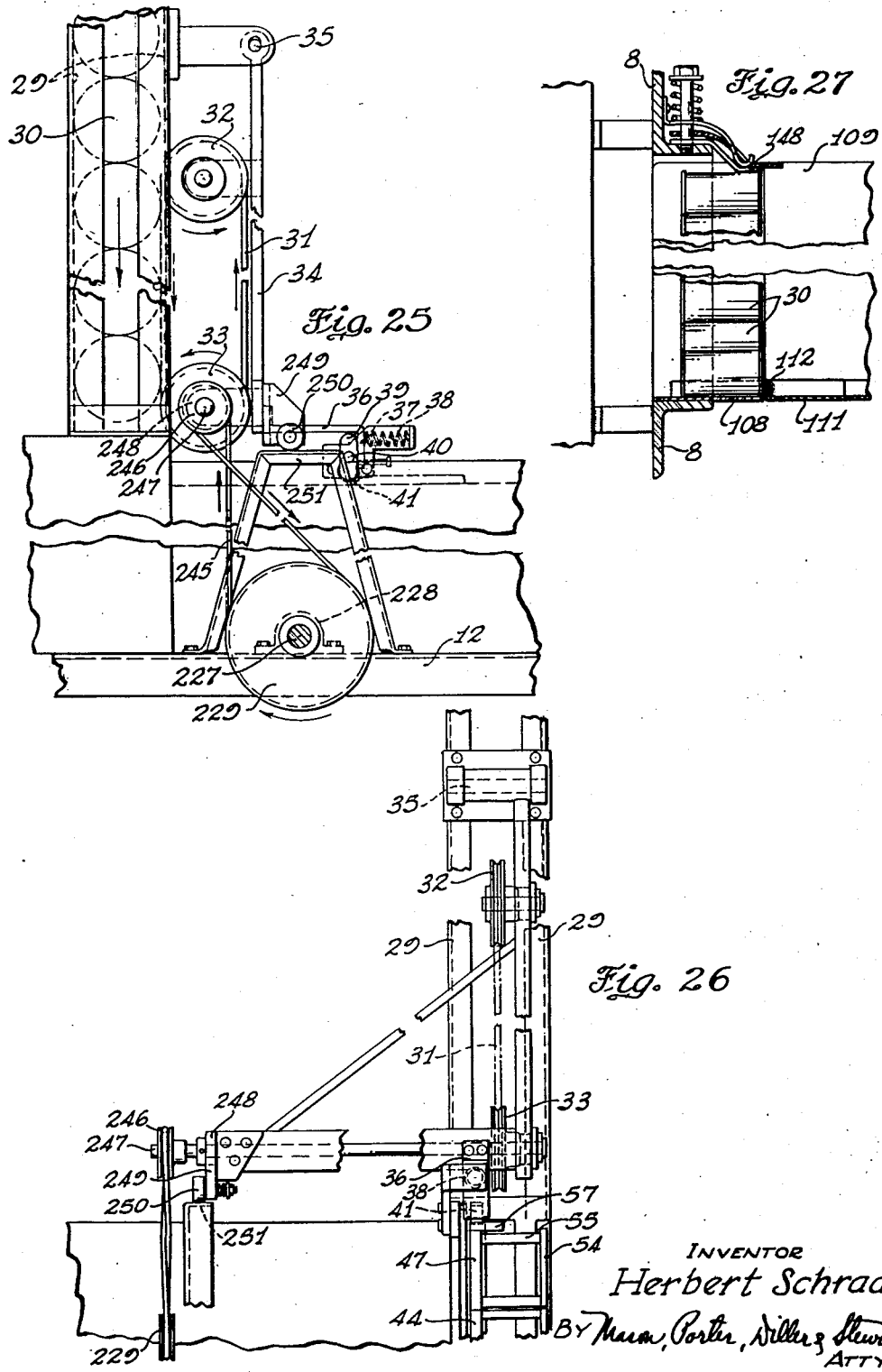

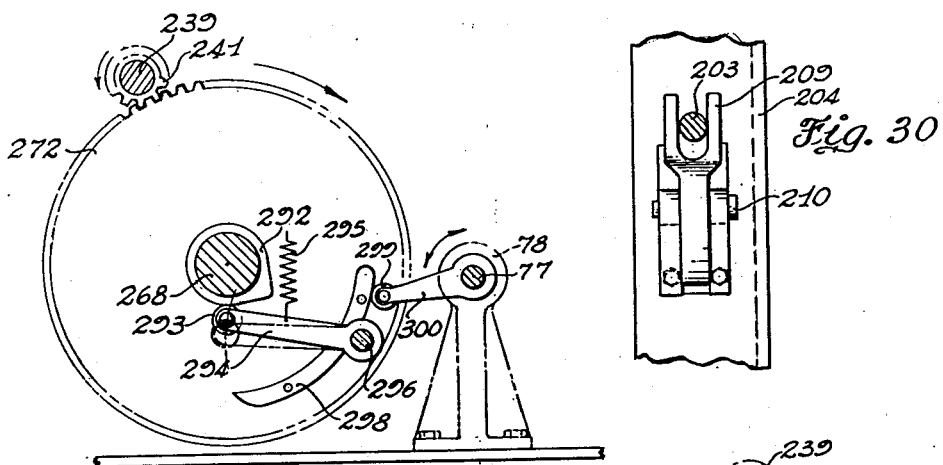
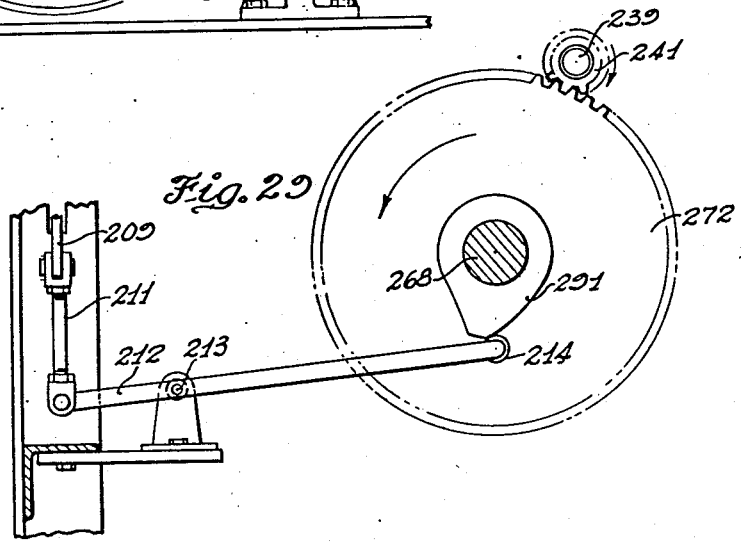
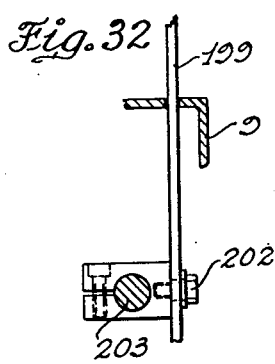
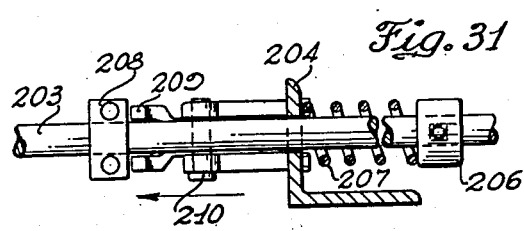

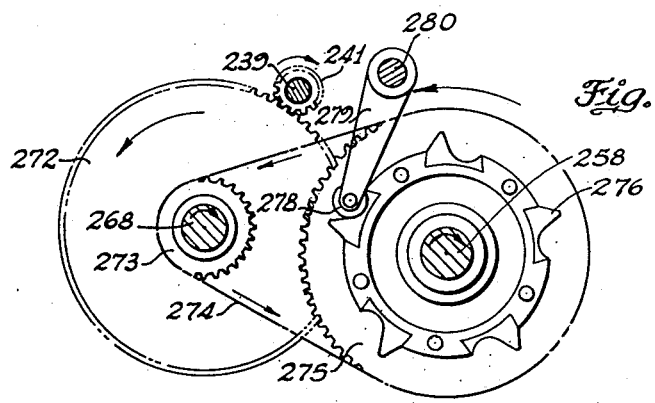
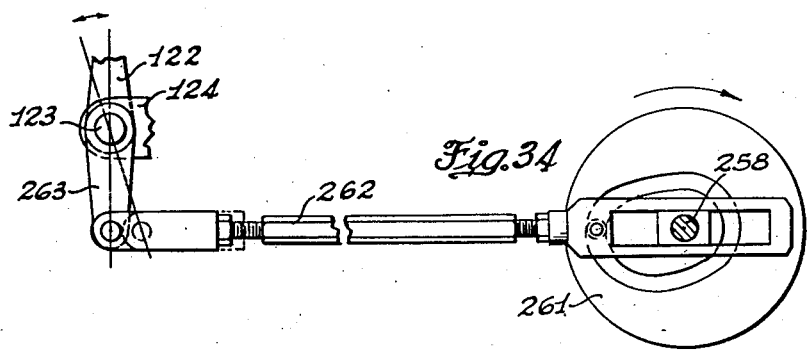
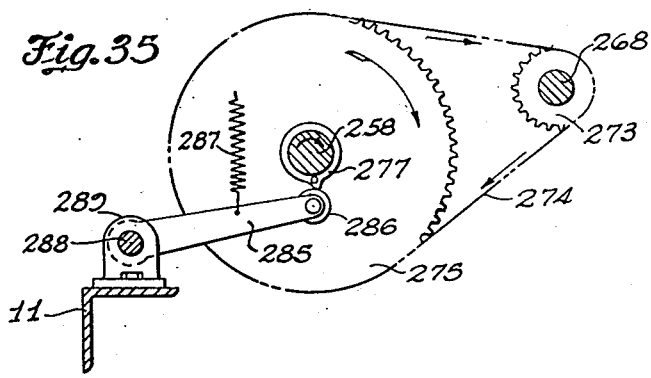

Dec. 27, 1949          H. SCHRADER          2,492,894
CAN ARRANGING AND BAGGING APPARATUS
Filed Aug. 3, 1948          14 Sheets-Sheet 13
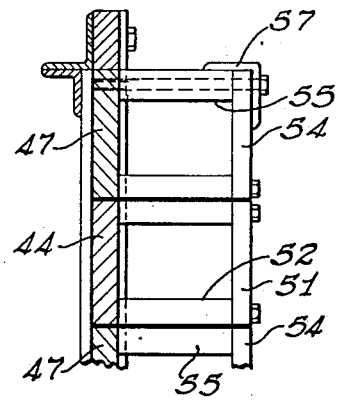
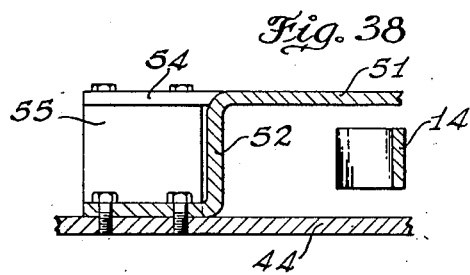
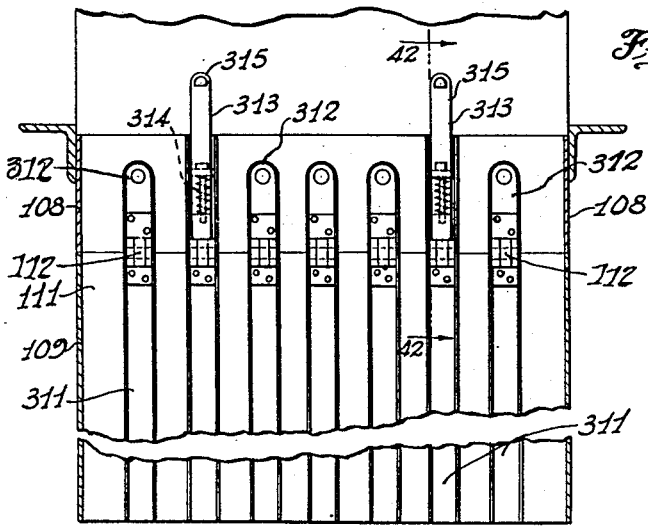
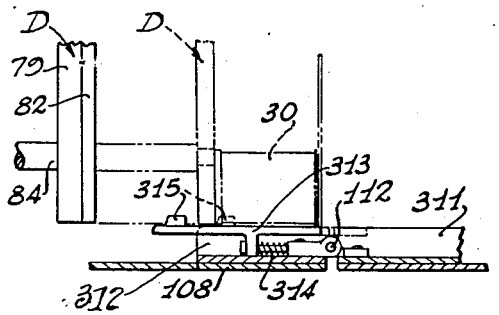
INVENTOR
Herbert Schrader
By Mason, Porter, Diller & Stewart
ATTYS.

Dec. 27, 1949     H. SCHRADER     2,492,894
CAN ARRANGING AND BAGGING APPARATUS
Filed Aug. 3, 1948     14 Sheets-Sheet 14
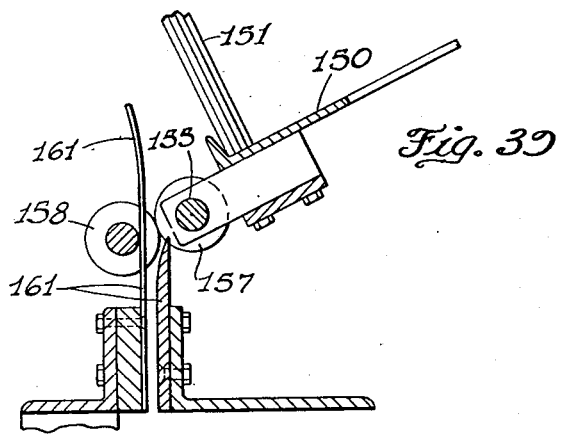
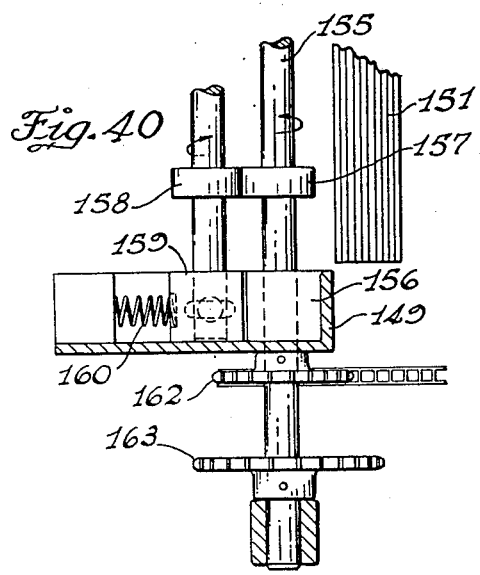
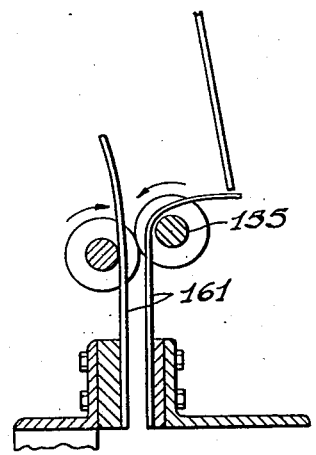
INVENTOR
Herbert Schrader Patented Dec. 27, 1949

2,492,894

UNITED STATES PATENT OFFICE 2,492,894

CAN ARRANGING AND BAGGING APPARATUS

Herbert Schrader, Chicago, Ill., assignor to Continental Can Company, Inc., New York, N. Y., a corporation of New York Application August 3, 1948, Serial No. 42,245

30 Claims. (Cl. 226—15)

The invention relates generally to the can manufacturing art and primarily seeks to provide a novel apparatus for arranging manufactured cans in staggered and nested row relation to form a tier complement and then placing successively formed tier complements in bags or cartons wherein they are retained in compact relation for easy handling, storage or shipment.

Such great strides have been made in the production of efficient can making machinery that the speed of producing the cans has far outstripped the known methods and apparatus for handling the manufactured cans. As a result, much wastage of time and labor is entailed in the handling of the cans after they are manufactured, and it is commonly known that the cost of handling manufactured cans is greater than the cost of manufacturing the same. It is a purpose of the present invention to provide a novel apparatus for rapidly and compactly arranging cans and placing them in bags or cartons in the manner stated, thereby to eliminate the wastage of time and labor referred to.

While it is somewhat common practice to package cans for distribution to the market in cartons or bags, it is the usual practice to place the cans row beside row and tier upon tier without any staggering and nesting of the rows. The smooth, light weight cylindriform cans are difficult to handle, and problems are presented, not only in the placement of the cans in the receptacles, but also in providing compact, sturdy packages that will not readily break up. When relatively light weight bags constitute the receptacles in which the cans are packaged for the market, the problems of placement and retention in order of the cans is accentuated because of the flexibility of the bag material and the vulnerability thereof to tearing stresses incident to relative movement of the cans and contact of the sharp flanges thereof with the bag material. The placement of the cans in staggered and nested row relation in can tier complements provides a measure of mutual support in the can arrangement which facilitates the provision of compact, tight and stable packages. An important advance in the art was provided in the can arranging and bagging apparatus disclosed in the copending application for U. S. Letters Patent Ser. No. 620,359, filed by Walter M. Tomkins on October 4, 1945. In the apparatus of said application the cans are moved in a direction perpendicular to their axes into a receiving and confining form or chamber, and while being so moved are guided and controlled so as to be placed in staggered and nested row relation. It is a purpose of the present invention to so move and place the cans, but in providing for the staggering and nesting of the can rows the cans are first formed in individual rows with the cans therein held in the proper zig-zag or staggered relation, and then each row so arranged is bodily pushed into the receiving and confining form or chamber.

Another object of the invention is to provide an apparatus of the character stated including a can tier complement receiving and confining form having a backing plate, a reciprocable pusher having a can row engaging face of zig-zag shape corresponding to the staggered relation the cans of a row are to assume in the form, means for successively presenting rows of cans before said pusher face, and means for reciprocating the pusher to cause it to move each successively presented can row with the cans therein in staggered relation into the form and onto the backing plate.

Another object of the invention is to provide an apparatus of the character stated in which there are included devices for holding a bag open before the form, and means for moving the backing plate after the accumulation of a tier complement of cans thereon in staggered and nested row relation in the direction of the axes of the cans to place successively accumulated tier complements of cans in the bag.

Another object of the invention is to provide in apparatus of the character stated, novel means for placing a tier sheet before each tier complement before it is pushed into the bag, thereby to separate the tiers in the bag.

Another object of the invention is to provide an apparatus of the character stated in which the can row pusher is formed in separable sections and means is provided for at times rendering the pusher sections selectively movable to push less than a full row of cans into the form.

Another object of the invention is to provide an apparatus of the character stated in which the can row pusher sections are of a size for pushing individual cans and there is included control means effective to cause all sections to move together during the pushing of all can rows into the form but the last, and at that time to cause alternate sections only to move and push less than a full row of cans into the form in position for filling out a tier complement therein with a can in each of the four corners of the form.

Another object of the invention is to provide an apparatus of the character stated in which the means for successively presenting rows of cans before the pusher face includes a pair of guide rails of zig-zag shape disposed to place the cans of each row in proper staggered relation for mutually engaging with can rows previously and subsequently pushed into the form and for being retained in that relation as they are being pushed into the form by the zig-zag face of the pusher, means also being included for displacing the guide rail from in front of the pusher as it moves to force each can row into the form.

Another object of the invention is to provide in apparatus of the character stated, novel means for holding the cans in the staggered row relation as the movable guide rail is moved away and the pusher advances to push said row into the form.

Another object of the invention is to provide an apparatus of the character stated in which the means for successively presenting rows of cans before the pusher face includes a driven feeder belt and means for shifting the belt to an ineffective position as the pusher moves forward to push a row of cans into the form.

Another object of the invention is to provide an apparatus of the character stated in which the tier complement receiving and confining form and its backing plate are uprightly disposed so as to place the can axes horizontally, and in which there are included magnet means for holding the can rows in the intended staggered and nested relation as they are advanced row by row thereover by the pusher.

Another object of the invention is to provide in an apparatus of the character stated a back plate composed of a back plate portion whereon the magnet means are located, and a face plate or stripper portion having openings therethrough through which the magnet means project, and means for reciprocating the back plate, said back plate portion and stripper portion being movable in unison during the initial movement of each tier complement of cans into the bag form, and said stripper portion being movable alone to complete each tier complement displacement so as to be effective to strip the cans from the magnet means.

Another object of the invention is to provide in an apparatus of the character stated a bag form over which a bag may be telescoped and which has an open mouth into which the back plate is adapted to push the successively accumulated tier complements of cans, said form being swingably mounted, and means also being provided for swinging the form downwardly into position for sliding the filled bag therefrom after the last tier complement of cans has been pushed thereinto.

Another object of the invention is to provide in apparatus of the character stated novel bag clamping devices and control means therefor effective to cause the clamping devices to hold a bag against the bag form while it is being moved downwardly from its bag filling position to its bag discharging position, and for releasing the bag when the form is at said filling and discharging positions to permit telescoping of the bag over the form and the gravitation of filled bags from the form.

Another object of the invention is to provide in apparatus of the character stated an inclined support whereon to receive the bag form as it is swung down to its bag discharging position, said support including a hingedly mounted section swingable to an upright position in which it presents the open top of a filled bag upwardly.

With the above and other objects in view that will hereinafter appear, the nature of the invention will be more clearly understood by reference to the following detailed description, the appended claims, and the several views illustrated in the accompanying drawings.

In the drawings:

Figure 1 is an enlarged fragmentary face view illustrating that portion of the machine on which the cans are arranged in staggered and nested row relation, the can pushers being shown retracted and a tier complement of cans being illustrated in dot and dash lines as arranged over and held against the magnets, the bag receiving form being shown in section and the can hold down plate being omitted in interest of clarity, and parts being broken away and in section.

Figure 2 is a left end elevation, the tier sheet feeding means being omitted and the bag receiving form being shown in its elevated, receiving position with a bag mounted thereover, and parts being broken away and in section.

Figure 3 is a fragmentary horizontal section taken on the line 3—3 on Figure 2 and illustrating the pressers which hold the cans in place prior to their being shifted over onto the holding magnets.

Figure 4 is a plan view and part horizontal section illustrating the arrangement of the driving devices and the cam shafts.

Figure 5 is a right end elevation of the machine, the bag receiving form being shown in its elevated, receiving position in full lines, and in its lowered, filled bag releasing position in dot and dash lines.

Figure 6 is a fragmentary vertical cross section taken on the line 6—6 on Figure 11 and illustrating one of the tier sheet kicker rolls and the means for moving the same into and out of contact with the tier sheets.

Figure 7 is a fragmentary vertical cross section illustrating one of the tier sheet edge guides.

Figure 11 is a fragmentary face view illustrating the tier sheet feeding means.

Figure 12 is a fragmentary vertical cross section showing the tier sheet separating suction cups pressed against the tier sheet stack or supply.

Figure 13 is a detail vertical cross section taken on the line 13—13 on Figure 11.

Figure 14 is a fragmentary right side elevation showing the bag receiving form in its elevated position in full lines and lowered onto the support in dot and dash lines to permit a filled bag to slide into the filled bag receiver, said receiver being shown as swung to its upright, discharging position in dot and dash lines.

Figure 15 is an enlarged detail plan view illustrating one of the bag grippers attached to the sides of the bag receiving form, parts being broken away and in section and the gripper being shown in the bag releasing position in full lines and in the bag gripping position in dot and dash lines.

Figure 16 is an enlarged detail plan view of one of the filled bag receiver retaining latches, parts being broken away and in section.

Figure 17 is a fragmentary side elevation illustrating the bag form part aligning engagement of the bag form reinforcing strap members.

Figure 18 is a fragmentary plan view illustrating the cam means for imparting oscillatory movement to the can presser actuating eccentrics, and also the cam means for operating the can pusher, parts being broken away and in section.

Figure 19 is a front elevation of the parts shown in Figure 18.

Figure 20 is a fragmentary front elevation illustrating the releasable latch couple of the can pusher actuating means, parts being broken away and in section.

Figure 21 is a plan view and part horizontal section of the parts shown in Figure 20.

Figure 22 is a fragmentary rear face view showing the cooperative relation of the can pushers, the fixed and retractable can guides and the can holding magnets.

Figure 23 is a fragmentary sectional view taken on the line 23—23 on Figure 4 and illustrating the pusher actuating cam.

Figure 24 is a fragmentary horizontal sectional view illustrating the retractable tier sheet guide actuating means.

Figure 25 is an enlarged fragmentary rear face view illustrating the retractably mounted end of the can kicker belt conveyor.

Figure 26 is a fragmentary right end elevation showing the parts illustrated in Figure 25.

Figure 27 is an enlarged fragmentary vertical cross section showing the can hold down plate disposed over the entrance into the bag receiving form, the section being taken on the line 27—27 on Figure 11.

Figure 28 is an enlarged fragmentary vertical cross section illustrating the clutch tripping and pusher drive uncoupling member vibrator actuating cam devices, the section being taken on the line 28—28 on Figure 4.

Figure 29 is an enlarged fragmentary vertical cross section illustrating the tier sheet guide vibrating cam, the section being taken on the line 29—29 on Figure 4.

Figure 30 is a fragmentary vertical cross section illustrating the rod shifting fork of the tier sheet guide vibrating means shown in detail in Figure 24.

Figure 31 is a horizontal sectional view illustrating the fork device shown in Figure 30.

Figure 32 is a fragmentary vertical cross section taken on the line 32—32 on Figure 1.

Figure 33 is a fragmentary vertical cross section illustrating the tier sheet gripper actuating cam devices, the section being taken on the line 33—33 on Figure 4.

Figure 34 is a fragmentary right side elevation illustrating the cam and lever devices effective for lifting and lowering the bag receiving form, the section being taken on the line 34—34 on Figure 4.

Figure 35 is a fragmentary vertical cross section illustrating the clutch tripping cam device, the section being taken on the line 35—35 on Figure 4.

Figure 36 is a fragmentary horizontal section through the bottom portion of the bag receiving form near the bottom thereof.

Figure 37 is a fragmentary vertical cross section taken through several can pushers on the line 37—37 on Figure 1.

Figure 38 is a fragmentary horizontal section taken through the can pushers on the line 38—38 on Figure 1.

Figure 39 is a fragmentary vertical cross section taken through the tier sheet feeder rolls on the line 39—39 on Figure 11.

Figure 40 is a fragmentary horizontal sectional view illustrating a pair of the tier sheet feeder rolls.

Figure 41 is a fragmentary vertical cross section taken through the tier sheet feeder rolls on the line 41—41 on Figure 11.

Figure 42 is a fragmentary vertical cross section taken on the line 42—42 on Figure 36.

In the practical development of the invention, there are provided a can tier complement receiving and confining form or chamber generally designated A, means generally designated B for receiving cans in upright row relation with their axes disposed horizontally and staggering them for introduction into the form or chamber A, and a pusher means generally designated C for pushing the individually formed rows of cans into the form or chamber. This general arrangement of parts is best illustrated in Figure 1 of the drawings.

As each tier complement of cans is being arranged row by row by the successive pushing of the individual uprightly arranged and staggered rows of cans into the form or chamber, said cans are magnetically held against a back plate structure generally designated D. In the example illustration made herein each tier complement of cans is made to comprise eight uprightly arranged rows as shown in Figure 1, seven of said rows each comprising seven cans arranged in staggered relation, and the eighth row, shown farthest to the left in Figure 1, comprising only four cans having their centers arranged in the same vertical plane. It will be noted that this arrangement provides fifty-three cans with a can disposed in each of the four corners of the chamber or form, all of the cans being in staggered and nested row relation so as to provide a very compact and stable package. It is to be understood, however, that the number of cans in each tier complement and in the respective rows may be varied to suit different packing demands.

Figure 1:
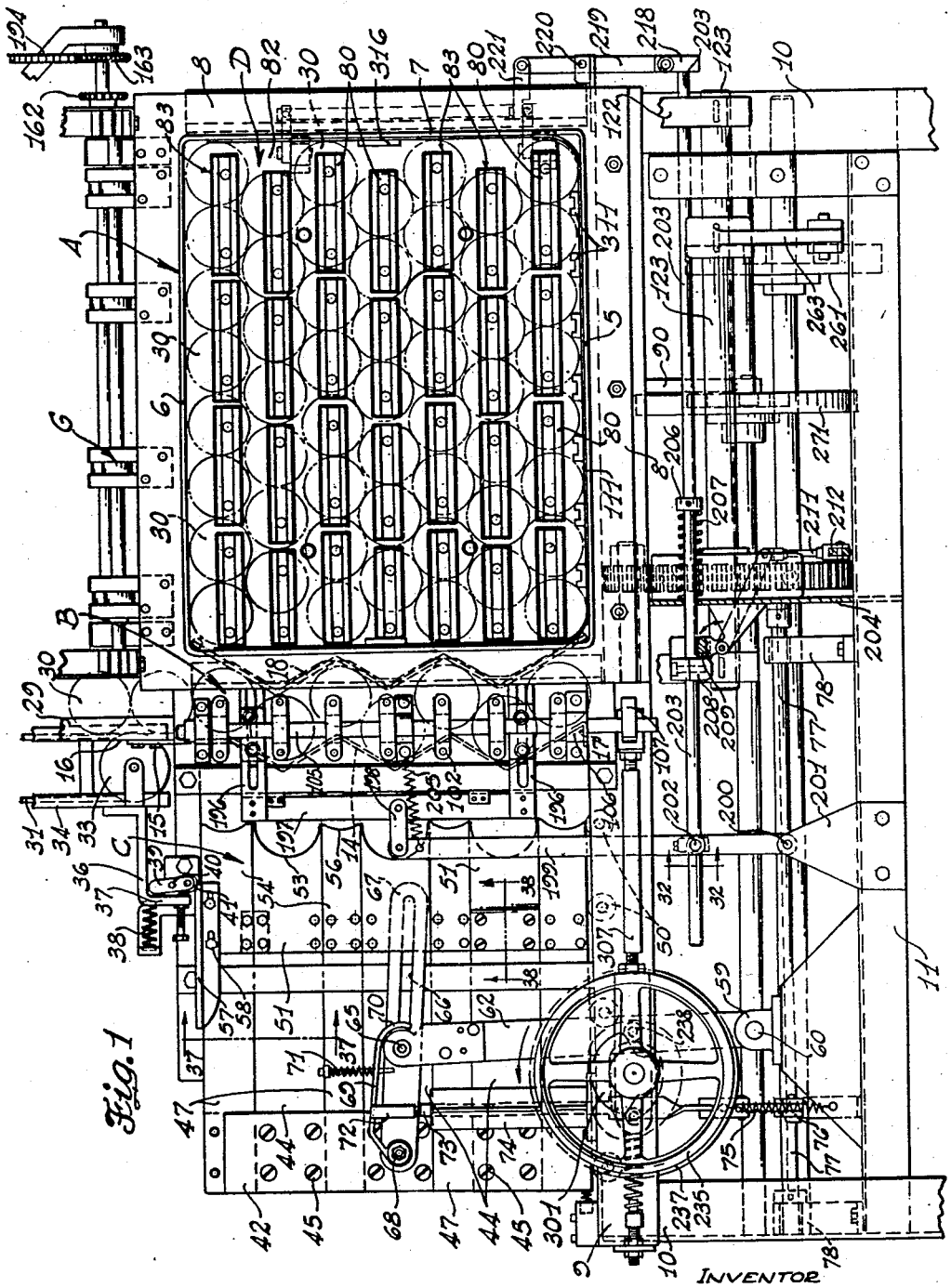

After each tier complement of cans is arranged in the manner illustrated in Figure 1 the back plate structure generally designated D is pushed forwardly to move the tier complement of cans into a bag form generally designated E and over which a paper bag generally designated F and in which the cans are to be packaged is telescoped in the manner clearly illustrated in Figure 2 of the drawings. Before each tier complement of cans is pushed into the bag form a tier sheet is placed in front of the same so that it will be pushed into the bag with the cans and serve as a means for separating the tier complements. This feeding of tier sheets individually in front of the tier complements of cans in timed relation to the pushing of the cans into the bag form is accomplished by a tier sheet feeding means generally designated G and best illustrated in Figures 5 to 7 and 11 to 13.

After the proper number of tier complements of cans have been successively pushed into the bag form, said form is lowered onto a downwardly inclined supporting frame generally designated H in the manner clearly illustrated in Figures 5 and 14 of the drawings so that the bag F can gravitate into the receiver form generally designated I which is swingably mounted so that it can be moved into the upright position illustrated in dot and dash lines in Figure 14 to place the can filled bag uprightly with its open top uppermost, thereby to facilitate sealing and removal of the filled bag.

The form or chamber generally designated A may include a floor 5, a top wall 6 and an end wall 7, and it may be suitably supported on a frame superstructure 8 arising from the frame table 9. See Figures 1, 2, 5, 14 and 27.

It will be apparent by reference to Figures 1, 2 and 4 that the frame table portion 9 is composed of angle irons arranged in the form of an open rectangle, and this table portion is supported on legs or standards 10. The frame structure also includes a lower angle iron frame border 11 secured to the corner standards 10 in the manner clearly illustrated in Figures 1, 2 and 4, and it will be noted also by reference to Figures 2 and 4 that longitudinal and parallel spaced intermediate frame pieces 12 are provided at the level of the table portion 9, and that similarly arranged intermediate frame pieces 13 are provided at the level of the frame border 11.

The means generally designated B for receiving and arranging the cans in zig-zag row relation for being pushed into the form or chamber A is best shown in Figures 1, 2 and 22 and includes a fixed zig-zag rail 14 which is uprightly disposed and secured as at 15 at its upper end to the fixed upright frame piece 16. Said rail is fixedly secured as at 17 at its lower end on one of the angle irons of the frame table portion 9. A movable zig-zag rail 18 cooperates with the fixed rail 14 and is secured at its upper and lower ends on support rods 19 which are horizontally disposed and slide guided at 20 in the flanges of a rigidly mounted frame standard 21. The rods have abutments 22 secured thereon, and compression springs 23 encircling the rods and interposed between said abutments and the adjacent flange of the standard 21 constantly tend to move the rail into its effective position in a common vertical plane with the fixed rail 14. It is to be understood that the movable rail is retracted from its effective position at the time each row of cans is pushed into the form of chamber A, and for this purpose the rods 20 are connected by an actuater bar 24 to which a roller 25 is fixed in position for being engaged by the rotary cam 26. Each time the pushing means generally designated C advances to push a row of cans into the form or chamber A the cam 26 will move the bar 24 to the left as viewed in Figure 2 for displacing the movable rail 18 from its effective position illustrated in Figure 22 to permit the pusher means generally designated C to push the row of cans into the form or chamber A, and after this pushing of each can row has been accomplished and the pusher devices retracted sufficiently, the springs 23 will return the rail 18 to said effective position. The cam 26 is rotatable with a driving sprocket 27 about a stud 28 fixed to the frame standard 21.

In order to provide for the feeding of cans into zig-zag row relation between the guide rails 14 and 18 in the manner illustrated in Figure 22 there are provided uprightly disposed can feed guides 29 through which the cans are fed downwardly in the manner illustrated in Figures 1, 11, 25 and 26 into the space between said rails. The cans designated 30 move downwardly through the guides 29 by action of gravity augmented by the accelerator belt 31 which is disposed between two of the guides in the manner illustrated in Figure 26 and trained over an upper idler pulley 32 and a lower driver pulley 33. The pulleys are mounted on a supporting arm 34 which is pivotally mounted at its upper end as at 35 and has its lower end equipped with a bracket extension 36 having a downwardly turned end portion 37. A spring means 38 engages the bracket extension 37 and constantly tends to press the belt against the cans within the guides 29. A belt displacing rocker arm 39 is uprightly disposed and pivoted intermediate its ends as at 40 on a fixed bracket supported above the pusher means C. The upper end of the rocker arm 39 is disposed in position for contacting the downwardly extended end 37 of the bracket 36, and at its lower end said arm carries a roller 41. It will be apparent by reference to Figures 1 and 11 of the drawings that whenever the roller 41 is engaged and pushed toward the right, the upper end of the arm 39 will engage the bracket extension 37 and push the pivotally suspended arm 34 to the left in a manner for displacing the accelerator belt 31 from its effective contact with the cans 30 in the upright guides 29. The means for thus actuating the belt displacing arm 39 will be described hereinafter, and it is to be understood that the belt is displaced in the manner stated each time a row of cans is being pushed into the form or chamber A, thereby to avoid positive feeding of cans downwardly during said inward pushing of cans.

The pusher means generally designated C comprises a face plate 42 and a back plate 43 normally disposed to lie in face to face alignment in the manner illustrated in Figures 1, 2 and 22 of the drawings. Three pusher bars 44 are secured at 45 to the face plate 42, and each thereof is provided with a concave end surface 46 to conform to can shape and engage in pushing contact with the cans. Four pusher bars 47 are secured as at 48 to the back plate 43, and these also are provided with concave pusher end surfaces 49. The seven pusher bars all lie in the same vertical plane and rest and slide upon rollers 50 which are supported on the frame structure. It is to be understood that the number of pusher bars will vary with the number of cans to be included in the uprightly arranged rows which are to be successively pushed into the form or chamber A. As previously explained, said rows each comprise seven cans in the example of embodiment of the invention disclosed herein.

It is desirable to engage the horizontally disposed cans at spaced points in order to overcome any tendency of the cans to turn askew as they are being pushed into the form or chamber A, and for this reason the relatively thin pusher bars are supplemented by supplementary pushers spaced from the previously described pusher bars for the purpose stated. This spacing of the supplementary bars is clearly illustrated in Figures 1, 37 and 38 of the drawings. Supplementary pusher bars 51 are spaced as at 52 from the three pusher bars 44, and each thereof is provided with a concave pusher end portion 53, and supplementary pusher bars 54 are spaced as at 55 from the four pusher bars 47, each thereof also including a concave pusher end portion 56.

It will be apparent by reference to Figures 1 and 26 of the drawings that the uppermost pusher bar 47 has a cam 58 adjustably secured thereon as at 58 in position for engaging the roller 41 at the lower end of the rocker arm 39 and actuating said arm each time the pusher means is advanced for the purpose of displacing the accelerator belt 31 in the manner previously described.

In the suitable frame supported bearings 59 there is mounted a shaft 60 on which a sleeve 61 is rockably supported in the manner best illustrated in Figures 1 and 2 of the drawings. Two driver arms 62 and 63 extend upwardly in spaced relation from the sleeve 61, the arm 62 passing to the front of the pusher bars 47 and 44 and the arm 63 passing to the rear of said bars. The arm 63 is pivot-link connected at its upper end as at 64 to the four bar pusher plate 43 as shown in Figures 2 and 22, and the arm 62 is equipped at its upper end with a driver pin 65. See Figures 1, 20 and 21. The driver pin passes through a longitudinal slot 66 in a driver link 67 which is pivoted at 68 to the three bar pusher plate 42. A drive release claw member 69 is pivoted on the pivot pin 68 and has a curved end portion 70 which is engageable over the upper end of the arm 62 to normally cause the pusher plate 42 to move with said arm as it is moved on its pushing stroke toward the right as viewed in Figure 1. Spring means 71 constantly tends to hold the claw member 69 in the drive coupling position just referred to, and in this condition of the parts all of the seven pusher bars 44 and 47 will reciprocate in unison.

A release member 72 is secured to the claw member 69 in position for being engaged by a vertically reciprocable, spring lowered release bar 73 which is slidable in a guide bracket 74 secured upon the frame table portion 9. See Figures 1, 2, 20 and 21. The release bar 73 is pivot-link connected as at 75 at its lower end to a crank 76 projecting from an actuator shaft 77 which is rockably mounted in frame supported bearings 78. It will be apparent that whenever the shaft is rocked in a direction for moving the release bar 73 upwardly, said bar will contact the release member 72 and displace the claw member 69 from the normally effective position illustrated in full lines in Figures 1 and 20 to the ineffective dot and dash line position illustrated in Figure 20. It is to be understood that this releasing of the claw member 69 will be accomplished at each eighth forward stroke of the pusher bars 44, 47 as a unit, and after the claw member has been so released only the plate 43 and the four pusher bars 47 will be advanced, thereby to push only four cans into the form or chamber A to comprise the uprightly arranged row illustrated at the extreme left in Figure 1. It is to be understood that upon each advancing of the pusher means, whether it be all seven bars, or merely the four bars 47, the uppermost bar will act as a cut-off and prevent downward movement of cans 30 out of the upright guides 29, and when the four bars 47 alone are advanced in the manner just described, the two intermediate bars of the set of four will move between the cans opposed by the ends of the idle bars 44, leaving them in their position beside the fixed zig-zag rail 14 while the other four cans of the seven arranged in upright zig-zag row relation are pushed into the form or chamber A in the manner described.

The back plate structure generally designated D and best illustrated in Figures 1, 2 and 8 to 10 comprises a rectangular back plate portion 79 having a plurality of rows of permanent magnets 80 secured thereon as at 81. It will be apparent by reference to Figure 1 that the magnets of each row are arranged in longitudinal alignment horizontally across the front face of the plate portion 79, and that a row of magnets is provided for each of the seven rows of cans arranged horizontally across said plate portion as illustrated in Figure 1. With this arrangement, one of the magnets will be opposite each can of each of the upright rows in which the cans are arranged in staggered relation, it being noted that the cans in said horizontally disposed rows are arranged with their axes in a common horizontal plane. The back plate portion 79 is opposed by a face plate portion 82 which is cut out as at 83 to clear the magnets and present the effective faces of said magnets substantially flush with the front face of the face plate portion 82. Both plate portions 82 and 79 may be formed of aluminum so as to minimize mass weight, and if desired the forwardly presented portion of the face plate portion 82 may be faced with brass.

The face plate portion 82 is secured on the ends of upper and lower pairs of pusher rods 84 which pass through apertures 85 in the back plate portion 79 and are slidable in bearings 86 supported on a superstructure frame portion 87. The rods 84 are secured to a pusher plate 88 which is pivot-link connected as at 89 to the upper end of a pusher arm 90. The arm 90 is pivotally mounted intermediate its ends as at 91 on a transverse frame piece 92, and it will be apparent that as the arm 90 is oscillated the face plate portion 82 will be reciprocated forwardly and rearwardly, carrying with it the back plate portion 79 when cans 30 are held against the magnets 80 in the manner illustrated in Figures 1 and 8 of the drawings.

Support bars 93 are secured as at 94 to the back plate portion 79, extending rearwardly and horizontally therefrom. The bars 93 are slidable in guides 95 supported on the frame structure 87 and are equipped with stops 96 secured thereon in position for contacting the frame structure 87 in the manner illustrated in full lines in Figure 8 after the face plate portion 82 and back plate portion 79 have moved in unison a portion of the distance forwardly necessary to push a tier complement of cans into the bag form. It will be apparent that after the stops engage the frame structure in the manner stated, continued forward movement of the pusher plate 88 and rods 84 will move the face plate portion 82 alone, thereby to strip the cans 30 from the magnets 80 and push them into the bag form.

In order to apply pressure to the ends of the cans in the row arranging means B so as to hold the cans under control while they are being pushed over onto the magnets 80 within the receiving form or chamber A, and for holding the three cans in place which remain adjacent the fixed rail 14 as the final row of four cans is pushed into said form or chamber, there is provided an arrangement of spring pressure plates best illustrated in Figures 1, 2 and 3 of the drawings. On an upright face plate 97 rigidly supported on the frame structure there are mounted a plurality of pairs of tubular guides 98. These guides may be threadably mounted as shown in Figure 3 and are arranged opposite the zig-zag rails 14, 18 as shown in Figure 1. A plunger 99 is reciprocable in each guide 98, and the rear face of the plate at the position of each guide is recessed as at 100 to receive a presser plate 101 secured to the end of the respective plunger. The plungers projecting forwardly from each pair of guides 98 are connected by a cross bar 102, and spring means 103 encircling each rod and engaging between an abutment on the rod and an abutment within the respective guide constantly tends to displace the respective presser plate 101 from its receiving recess 100 and cause the same to yieldably press against the open end of the adjacent can. The limit to which the springs 103 may force the plates 101 rearwardly is determined by cams 104 eccentrically mounted on an upright shaft 105 which is rockably mounted in bearings 106, said cams being disposed to engage the several cross bars 102. The shaft 105 has a crank arm 107 fixed to its lower end, and it will be apparent that as the shaft 105 is rocked in one direction it will cause the eccentric cams 104 to engage the bars 102 and retract the plates 101 so as to withdraw them from their can end contacting position while cans are being fed downwardly in staggered row relation between the rails 14 and 18, and when said shaft is rocked in the opposite direction it will release the bars 102 and permit the springs 103 to press the plates 101 in yielding contact against the open ends of the cans during the pushing of cans into the receiving form or chamber A in the manner stated.

Attention is directed to Figures 1, 2, 5 and 14 wherein the bag form and the filled bag discharge rack are best illustrated. It will be noted that the bag form generally designated E includes a fixedly mounted receiving portion 108 which is U-shaped in upright cross section as shown in Figure 1, having a bottom and sides and no top, and a similarly shaped swingably mounted portion 109 having sides 109, an open outer end at 110 and a bottom 111. The bottom 111 of the swingably mounted bag form portion is hinged as at 112 to the bottom of the fixedly mounted bag form portion. In the use of the apparatus the paper bags generally designated F are telescoped over the swingably mounted bag form portion in the manner clearly illustrated in Figure 2, and each said bag includes a bottom 113, sides 114 and an open top at 115. Aligning support bars 116 are secured to the sides of and extend forwardly from the fixedly mounted bag form portion 108 in the manner illustrated in Figure 2, and straps 117 secured to the sides 109 of the swingably mounted bag form are equipped with rollers 118 disposed to engage over the aligning bars 116 when the swingably mounted bag form portion is swung up to the receiving position illustrated in Figure 2 thereby to align the form sections and relieve the hinges of some of the weight of the form and the bag complement of cans as they are collected by the successive pushing of tier complements of cans into the receiving form and bag.

It will be apparent by reference to Figures 2, 14 and 16 that a bag clamp is provided at each side of the bag form. These clamps serve to clamp the open mouth of the bag against the sides 109 of the swingably mounted bag portion so as to cause the bag and the can complement filled thereinto to move properly with the form as it is swung down to the discharging position. Each clamp includes a plate 119 which is secured as at 120 to the respective side 109 of the swingable form, and each said plate is pivoted at 121 to the upper end of an actuator arm 122. The actuator arms 122 are secured to a rocker shaft which is disposed horizontally and is rockable in frame supported bearings 124. A bracket 125 is secured as at 126 to each plate 119 and a gripper member 127 is pivoted intermediate its ends as at 128 to each said bracket. Each gripper 127 is rubber faced as at 129 for engagement with the open mouth of the bag, and each rubber face is recessed at 130 to permit a leaf spring 131 secured to the respective gripper to project therethrough for contact with the side of the bag and the underlying plate 119. It will be apparent by reference to Figure 15 that as the grippers 127 move inwardly to engage the gripping surfaces 129 with the bag sides 111, the leaf springs will engage the bag adjacent its open mouth and draw the bag sides over the plates 119 so as to tightly engage the bag bottom against the open end 110 of the swingable form. A compression spring 132 is interposed between each plate 119 and the inner end of the respective gripper 127 so as to constantly tend to force the rubber faced end of the gripper against said plate 119.

A stud supported roller 133 projects from the inner end portion of each gripper 127 through an elongated slot 134 formed in a bracket extension 135 secured to the adjacent actuator arm 122. Each slot 134 is provided with a restricted end portion 136 at each of its upper and lower extremities just large enough to receive the roller 133, and intermediately of said restricted portions the slot is enlarged as at 137 to provide clearance for said roller to move toward the front in the manner indicated in dot and dash lines in Figure 15. The relation of the rock shaft 123, the bag form hinge 112 and the pivotal connection 121 between the actuator arms 122 and the gripper plates 119 is such that when the bag form is swung up to the receiving position illustrated in full lines in Figures 2 and 5 the gripper rollers 133 will be engaged in the upper restricted ends of the slots 134 and will hold the grippers away from the side plates in the manner illustrated in full lines in Figure 15. While the bag form is being lowered from the receiving position to its downwardly inclined discharging position the rollers 133 will be moved through the enlarged portion 137 of the slots 134 and the rollers will be freed to permit the springs 132 to press the rubber faced grippers 127 tightly against the bag mouth so as to firmly hold the bag and its complement of cans on the swingable form, and as the downwardly swinging bag form reaches its downwardly inclined discharging position said rollers will engage in the lower restricted ends 136 of the grooves 134 so as to again withdraw the grippers to the full lines position illustrated in Figure 15, thereby to release the bag and permit it to slide off the form into the receiver I supported on the rack H in the position illustrated in full lines in Figure 14.

The discharge rack H comprises a rack frame 138 including a downwardly and forwardly inclined support shelf portion 139 whereon the bag receiving form having an open top, sides 140, a closed bottom and a closed end is mounted on a right angular supporting frame 141 which is pivoted as at 142 to an end extension portion 143 of the discharge rack 138. The pivotally mounted support frame 141 has supporting feet 144, laterally extended handles 145 and rounded detent portions 146 which are normally yieldably retained in concave end notches in the spring pressed keeper plates 147 mounted on the sides of the supporting shelf 139 in the manner illustrated in Figures 14 and 16. After a bag and its complement of cans has gravitated into the receiver I the handles may be grasped to swing the receiver from the position illustrated in full lines in Figure 14 to the upright position illustrated by dot and dash lines in said figure. In said upright position of the receiver the supporting feet 144 will engage the floor and the open receiving end of the receiver will be presented uppermost to place the open mouth of the bag in position for facilitating the sealing of the bag and the removal thereof from the receiver.

In the forcing of the successively formed tier complements of cans into the bag form E by the back plate structure D each tier complement is caused to pass under a spring depressed plate 148 which serves to hold the cans of the tier complement in the desired compacted or in other words staggered and nested relation as they are moved into the bag form and the bag telescoped thereover. See Figures 2, 7 and 11.

The tier sheet feeding means generally designated G is best illustrated in Figures 5 to 7, 11 to 13, and 39 to 41 and includes a rigid frame structure 149 whereon supporting arms 150 for the sheet magazine or stack 151 are pivotally mounted as at 152, means being provided at 153 for adjustably tilting said supporting arms. Top guides 154 also are provided for the pack of tier sheets as shown in Figure 7. On a driver shaft 155 rotatable in fixed bearings 156 supported on the rigid frame structure are mounted a plurality of feed rolls 157. The rolls 157 are opposed by idler rolls 158 mounted on an idler shaft which is rotatable in bearings 159 which are slidably supported on the frame structure in the manner clearly illustrated in Figure 40. The slidably mounted bearings are yieldingly urged in a direction for contacting the idler rolls 158 with a tier sheet or the driven feed rolls 157 by compression springs 160, and when said rolls 158 and 157 grip a tier sheet between them, said sheet is fed downwardly between the guides 161 into position before the tier complements of cans in the manner previously described.

A driver sprocket 162 is secured on the roll driver shaft 155, and a driver sprocket 163 also is secured on said shaft.

A hollow rock shaft 164 is rockably mounted in frame supported bearings 165, and a plurality of hollow cup carrier rods 166 are extended downwardly from said shaft in the manner clearly illustrated in Figures 5, 11 and 12. The cup carrier rods 166 are connected at their free ends as at 167 and a cup support 168 is secured to the lower end of each carrier rod 166. A cup support 169 is mounted intermediately of the ends of each of the outer carrier rods 166, and each cup support 168 and 169 supports a suction cup 170 in position for engaging the foremost tier sheet of the pack 151 when the carrier rods are swung toward the pack in the manner illustrated in Figure 12. A suction duct means 171 affords communication between the interior of the hollow rock shaft 164 and the several cups 170 through the carrier rods 166, and it will be apparent that when said shaft is connected with a suction source and the suction cups pressed against the tier sheet pack 151 as in Figure 12 and then moved away as in Figure 5, the foremost sheet of the pack will be withdrawn.

An extension leg 172 swingable with the hollow rock shaft 164 has a duct 173 therein which communicates between the interior of the shaft and a duct 174 in the movable valve member 175 which is carried at the free end of said leg. The movable valve member 175 is yieldably pressed against the adjacent face of a fixed valve member 176 by a compression spring interposed between said movable valve and a bracket 178 secured on the shaft 164. By reference to Figures 11 and 13 it will be apparent that an extension 179 of the movable valve duct 174 is adapted to alternately communicate with the fixed valve duct 180 communicating with the suction source duct 181 or with a similar fixed valve duct connecting with the duct 182 which opens to atmosphere. Each time the suction cups are presented against the tier sheet pack as in Figure 12 the movable valve 175 will be shifted to communicate with the suction source connected duct 181, and when the suction cups are swung away toward the position illustrated in Figure 5 the movable valve ducts 174, 179 will communicate with the vacuum releasing or air duct 182 to break the suction and allow the tier sheet withdrawn from the pack 151 to fall into the guides 161 to be fed downwardly between the rolls 157 and 158.

In order to facilitate the feeding of the tier sheets and the proper presentation thereof between the guides 161 there is provided a plate 183 which is swingably supported as at 184 on the rigid frame 149, and said plate is equipped with a plurality of bearings 185 in which a shaft 186 is rotatably mounted. A plurality of kicker rolls 187 are secured on the shaft 186, and spring means 188 constantly tends to engage the kicker rolls with the foremost tier sheet in the pack 151. See Figures 6 and 11. A bracket 189 is secured on the rock shaft 164 and includes an extension 190 which is connected as at 191 with a bracket secured to the swingably mounted plate 183. The extension 190 and said plate connection 191 are so cooperatively positioned as to be effective each time the carriers 166 swing inwardly to engage the suction cups 170 with the tier sheet pack 151 to swing the plate 183 outwardly against the action of the springs 188 to move the kicker rolls 187 away from the pack in the manner illustrated in Figure 6. On the other hand, when the carriers 166 are swung forwardly to withdraw a tier sheet from the pack, the extension 190 and connection 191 function to allow the springs 188 to move the plate 183 and press the kicker rolls 187 against the foremost tier sheet so as to kick the same downwardly into the guides 161 and feed rolls 157, 158 just as the suction in the cups 170 is relieved through the ports 174, 179 and the duct 182 opening to atmosphere.

A spur gear 192 rotatable about the swing center of the plate 183 meshes with and drives a gear 193 secured on the kicker roll shaft 186, and said gear 192 is driven through sprocket and chain connections 194 from the said roll shaft 155.

In order to receive the individually fed tier sheets and properly present them in front of the tier complements of cans before they are pushed into the bag form and bag, tier sheet guides are provided, and these are subject to being vibrated between the tier sheet receiving position illustrated in Figure 24 and a separated or out-of-the-way position which it is desired they should assume as the back plate structure is moved forwardly to push the tier complement of cans into the bag form and bag. The tier sheet edge guides are designated 195, and the one at the left, as viewed in Figures 1 and 24, is connected to upper and lower slides 196 which project horizontally from the uprightly disposed actuator bar 197 which is pivot-link connected as at 198 to the upper end of an actuator arm 199. The actuator arm is pivotally mounted at its lower end at 200 on a frame supported bearing 201 and is pivotally connected as at 202 with a horizontally disposed shifter rod 203 which is slidable in suitable bearing means including the upright frame piece 204. See Figures 1, 4, 24, 30 and 31.

An anchored spring 205 connected with the upper end of the actuator arm 199 constantly tends to move the guides 195 inwardly to the position illustrated in Figure 24, and it will be noted also that the shifter rod 203 is provided with a fixed abutment 206 and that a compression spring 207 encircling the rod between said abutment and the frame piece 204 augments the action of the spring 205 in constantly tending to move the guides 195 toward each other. The shifter rod 203 also is equipped with an abutment 208 which is engaged by a bell crank fork 209 which is pivotally supported as at 210 and pivot-link connected as at 211 with an actuator arm 212. The actuator arm 212 is best shown in Figure 29 and is pivotally mounted intermediate its ends as at 213 on a frame supported bearing and equipped at its free end with a roller 214.

It will be apparent by reference to Figures 1, 5 and 14 that the sheet edge guide 195 at the right as viewed in Figure 24 has a shifter arm 215 connected therewith as at 216, said arm being pivoted as at 217 on a frame supported bearing. The shifter rod 203 has a head 218 secured thereto, and this head is pivotally connected to the lower end of an uprightly disposed actuator arm 219 which is pivoted intermediate its ends as at 220 on a frame supported bearing and has its upper end pivot-link connected as at 221 to the shifter arm 215. As the shifter rod 203 is moved to the right it moves the left hand edge guide 195 to the right through its connection with the actuator arm 199, the link 198, the bar 197 and the slides 196, and the same movement of the rod will act through the pivoted arm 219 and the link connection 221 to shift the shifter arm 215 and the connected right hand sheet guide to the left. Movement of the shifter rod 203 to the left will bring about a separation of the sheet edge guides 195 by reverse movement of the aforesaid connected parts.

Describing now the power source and the several driving and power applying devices, attention is directed to Figures 2 and 4. A motor 222 is supported on a bracket 223 suspended from the lower intermediate frame members 13, and a small pulley 224 on the motor shaft drives a belt 225 which passes over a large pulley 226 secured on the shaft 227 which is rotatable in frame supported bearings 228. The shaft 227 also has a large driver pulley 229 and a small driver pulley 230 secured thereon.

A belt 231 passing over the small driver pulley 230 drives a large pulley 232 secured on a cross shaft 233 which is rotatable in frame supported bearings 234 and equipped with a hand wheel 235 through which the various parts of the machine may be moved manually. It will be noted also that the cross shaft 233 is equipped with a small bevel gear 236 and a cam 237, the latter being engaged with a roller 238 projecting from the can pusher actuator arm 63. It is to be understood that the roller 238 is held against the cam 237, as by the connection of an anchored spring with the actuator arm 63 so that rotation of the cam will impart and control the desired reciprocation of the pusher means generally designated C.

A longitudinal shaft 239 is rotatable in suitable frame supported bearings and has a small bevel gear 240 secured thereon in position for meshing with and being driven by the previously mentioned bevel gear 236, said bevel gears 236 and 240 being of like size. The shaft 239 also is equipped with a small sprocket 242, a larger sprocket 243 and another small sprocket 244.

It will be apparent by reference to Figures 2, 4, 25 and 26 of the drawings that the pulley 229 on the shaft 227 drives a belt 245 which passes over a small pulley 246 secured on the shaft 247 on which the pulley 33 driving the accelerator belt 31 is mounted, and by this means the accelerator belt 31 is driven. The outer end of the pulley shaft 247 is rotatable in a bearing 248 having a bracket extension 249 which is equipped with a supporting roller 250 disposed to rest upon and roll on the frame pedestal 251.

The small sprocket 244 on the longitudinal shaft 239 drives a chain 252 which passes over and drives the sprocket 27 and cam 26 which serve to reciprocate the supporting rods 19 whereon the movable zig-zag rail 18 is mounted, thereby to alternately place and displace said rail with relation to the cooperating fixed zig-zag rail 14 of the can row receiving and arranging means generally designated B. This drive connection is best illustrated in Figure 2.

The other small sprocket 242 on the longitudinal shaft 239 drives a chain 254 which passes over and imparts rotation to the sprocket 255 which is connected with the driver portion 256 of the single rotation drive clutch 257 which is secured on the longitudinal shaft 258 rotatable in the frame supported bearings 259. The sprockets 242 and 255 have a one to four ratio. The clutch structure 256, 257 is of the conventional form in which the portion 256 idles about the shaft 258 and is effective to drive the shaft through a single rotation each time it is coupled with the clutch portion 257 by control devices to be described hereinafter. A friction brake means 260 grips the shaft 258 and is effective to prevent overrunning of the shaft as the clutch devices are automatically released after imparting each controlled single rotation to the shaft. The shaft 258 also has a bag form moving cam 261 secured thereon, said cam having connection with a thrust member 262 which is in turn connected with a crank 263 depending from the previously described rock shaft 123. It will be apparent that during each rotation of the shaft 258 the bag form will be swung downwardly from the receiving position illustrated in full lines in Figures 5 and 14 of the drawings to the bag discharging position illustrated in dot and dash lines in said figures, and then again returned to said receiving position.

The large sprocket 243 on the longitudinal shaft 239 drives a chain 264 which in turn drives a sprocket 265 of like size connected with the driver portion 266 of the single rotation drive clutch 267 which is secured on the longitudinal shaft 268 rotatable in the frame supported bearings 269. The clutch structure 266, 267 is like the previously mentioned clutch structure 256, 257 and the control devices associated therewith will be described hereinafter. Like the shaft 258, the longitudinal shaft 268 has a friction brake means 270 disposed to grip the same and prevent overrunning of the shaft as the clutch means 266, 267 is disengaged after a single complete rotation of said shaft. It will also be apparent by reference to Figures 4, 8 and 9 that the shaft 268 is equipped with a cam 271 having connection with the arm 90 through which proper reciprocatory movement is imparted to the backing plate structure D for pushing the successively arranged tier complements of cans into the bag form and bag.

A large spur gear 272 idles on the shaft 268, being continuously driven at a one to eight ratio by the small pinion gear 241 fixed on the longitudinal shaft 239. A small sprocket 273 rotatable with the gear 272 drives a chain 274 which passes over a large sprocket 275 mounted to idle about the longitudinal shaft 258. See Figures 4, 33 and 35. The sprockets 273 and 275 have a one to five ratio. A five-point star wheel 276 is rotatable with the large sprocket 275, and a clutch control cam 277 also is rotatable with said sprocket.

Engaged with the five-point star 276 is a roller 278 mounted upon the free end of a crank arm 279 projecting from a shaft 280 which is rockably mounted in suitable frame supported bearings. It will be apparent by reference to Figures 4 and 5 of the drawings that the shaft is equipped at its outer end with a crank arm 281 which is connected by a thrust link 282 with a crank 283 secured to the suction cup oscillating shaft 164 of the tier sheet feeding means. An anchored spring 284 constantly tends to hold the suction cups 170 away from the tier sheet pack and the roller 278 against the five-point star 276. It will be apparent that each time that one of the outwardly projecting star points of the cam 276 displaces the roller 278 the crank arm 283 will be lifted and the suction cups 170 pressed against the tier sheet pack 151, and when the roller 278 falls into one of the recesses beside the last engaged cam star point the suction cup carriers 166 will be swung by the spring 284 to the position illustrated in Figure 5.

It will be apparent by reference to Figures 4 and 35 of the drawings that the means for controlling the single rotation drive couples of the clutch means 257 with the clutch part 256 and the sprocket 255 includes a crank arm 285 equipped with a roler 286 disposed to engage the clutch control cam 277 which is rotatable with the large sprocket 275 and the five-point star wheel or cam 276. The arm 285 is biased by an anchored spring 287 to yieldably hold the roller 286 in engagement with the cam 277 and is secured on a shaft 288 which is rockably mounted in bearings 289 supported on one of the frame rails 11. The shaft 288 also is equipped with a clutch trip arm 290, and this arm projects for engagement and cooperates with the clutch means 257 in the manner indicated in Figure 4. As previously stated, this clutch means is of the well known single rotation drive type wherein the trip lever is moved out of contact with the clutch means 257 to permit the spring pressed clutching lug to move into contact with the rotating clutch part 256 and connect the same in driving relation with the clutch part 257 and the shaft 258 to which the same is secured in order to impart one complete rotation to said shaft, whereupon the trip lever 290 again engages the clutching lug and retracts the same from driving contact with the clutch member 256 so as to discontinue rotation of the clutch part 257 and the shaft 258. During the single rotation of the clutch part 257 and shaft 258, the cam 261 and thrust member 262 will bring about a movement of the bag form E from the full line position illustrated in Figure 5 to the dot and dash line position and then again back to said full line position to discharge a filled bag and return the form in position to receive another bag and its complement of cans.

The large gear 272 also carries a cam 291 which serves as the means for oscillating the arm 212 which is effective to shift the rod 203 and control the position of the tier sheet guides 195. See Figures 4, 24 and 29.

The clutch means 266, 267 operates in the same manner as the clutch means 256, 257 and the devices for controlling this clutch means are best illustrated in Figures 4 and 28 of the drawings. The large gear 272 also carries a clutch control cam 292 against which the roller 293 on the crank arm 294 is held by action of the anchored spring 295. The crank arm 294 is secured on one end of a shaft 296 which is rockably mounted in a frame bearing and carries the clutch tripping lever 297 at its other end. It is to be understood that each time the lever 297 is tripped to connect the clutch part 267 in drive relation with the clutch part 266 and the connected driving sprocket 265 a single rotation will be imparted to the shaft 268, engagement of the trip lever with the clutch part 267 serving to disconnect the driving lug in the well known manner after the completion of a single rotation of said shaft. During the single rotation of the shaft 268, the pusher arm 90 will be moved to impart one full projection and retraction to the can tier complement pushing back plate structure D in the manner previously described.

It will be observed by reference to Figures 4 and 28 of the drawings that the large gear 272 also carries a cam 298 which is engaged by a roller 299 projecting from the crank arm 300 which is secured on the previously described rock shaft 77. As the shaft 77 is rocked by engagement of the cam 298 with the crank arm roller 299 the release bar 73 will be moved upwardly to displace the claw member 69 from the full line position illustrated in Figure 20 to the dot and dash line position, thereby to uncouple the pusher plate 42 and render the pusher plate 43 and the connected four pushers 47 alone effective to push cans into the form or chamber A on the next forward movement of the driver arms 62, 63.

Attention is directed to Figures 1, 4, 18 and 19 from which it will be apparent that the cross shaft 233 has a cam 301 secured thereon in position for engaging the roller 302 projecting from the stirrup 303 which straddles said shaft. The stirrup is slotted to straddle the shaft and slide on the block 304 through which said shaft extends, and spring means 305 serves to yieldably hold the roller 302 against the cam 301. The stirrup 303 is pivotally connected as at 306 with one end of a thrust link 307 which is connected at its other end with the crank arm 107 extending from the previously described rock shaft 105. The rotating cam 301 thus imparts rocking movement to the shaft 105 and the eccentric cams 104 mounted thereon so as to alternately bring about a clamping of the plates 101 against the ends of the cans in the row forming means and release said pressure application in timed relation to the feeding of the cans into said row arranging means and the operation of the pushers which push the successively formed rows of staggered cans into the form or chamber A in the manner previously described.

The driving of the tier sheet feeding devices may be by way of a chain 308 passing over the sprocket 162 on the feed roll driving shaft 155 and over a sprocket 309 secured on a driver shaft 310 to which rotation may be imparted from a driver shaft on the machine or from a separate motor (not shown). See Figure 5.

If desired the swingably mounted portion of the bag form may have its floor or bottom 111 provided with a plurality of floor rails 311 arranged in parallel spaced relation so as to extend between the cans in the manner illustrated in Figure 1. The rails 311 may be extended over the floor of the fixed portion 108 of the bag form, the portions 312 extending over said fixed portion 108 being hingedly connected with the main bodies 311 of said rails so as to provide the previously mentioned hinge connections 112. Two or more of the rails may be provided with slidable extensions 313 which serve as supports upon which the tier sheets may fall in a manner preventing catching thereof behind the rail portions 312 and are spring urged as at 314 to the extended positions shown in full lines in Figures 36 and 42. The extensions 313 are equipped with upstanding lugs 315 which are engageable by the pusher plate assembly D each time it advances in the manner shown in dot and dash lines in Figure 42. It will be apparent by reference to Figure 42 that each time the can tier complement pushing back plate structure D is advanced to push a tier complement of cans and a tier sheet into the form, said structure will strike the lugs 315 in the manner indicated in Figure 42 and cause the front ends of the slides 313 to move forwardly over the hinges 112 to serve as tier sheet supports at the gaps between the hinged rail sections 311 and 312 and permit the pushing of said sheets into the form without any danger of the lower edge portion of the tier sheet catching in the gaps between said rail sections.

The side walls of the bag form may also be reinforced by securing reinforcing strips to the inner surface thereof in the manner illustrated in Figures 14 and 17 of the drawings. In this illustration, the strips 316 which are attached to the fixed and movable sections 108 and 109 respectively of the bag form are arranged in longitudinal alignment and provided with interengaging notch and tongue portions 317 which will be effective to line up the form portions and also supplement the previously described bar and roller devices 116, 118 in relieving the hinges 112 of the full weight of the swingable portion of the bag form.

*Résumé of operation*

Assuming the motor to be in operation, and the various driving connections cooperatively arranged as herein described, a row of cans is fed downwardly between the zig-zag rails 14 and 18 and the seven cans comprising the row as made up in this particular disclosure are arranged in the zig-zag or staggered relation shown at the vertical center in Figure 1. The whole pusher assembly C then advances and the seven bars 47, 54 and 44, 51 engage the seven cans in the row and push them into the form or chamber A where they will be held in the zig-zag or staggered row arrangement on the magnets 80.

As the pusher bars advance, the uppermost bar cuts off the supply of cans in the vertical guide ways 29, and the cam 57 engages the roller 41 on the member 39 and causes said member to displace the feed belt 31 from its accelerating contact with the cans 30 in the guides 29. At this time the cam 301 functions to rock the shaft 105 so as to release the bars 102 and allow the springs 103 to press the plates 101 against the ends of the cans arranged in zig-zag relation in the row arranging means B, said plates having been spaced away during the downward feeding of the cans into said row arranging means. As the pusher bars 47, 54 and 44, 51 approach contact with the arranged row of cans the cam 26 functions to retract the movable rail 18 out of the way of the cans as they are pushed into the form or chamber A. As the pusher bars are retracted the rail 18 is returned to its effective position opposite the fixed rail 14 to receive the next row of cans to be arranged between said rails.

This process is repeated, and upon each forward movement of the pusher bars the staggered can rows previously pushed into the form or chamber A are moved step by step toward the right as viewed in Figure 1 until seven identical rows are arranged in the chamber as illustrated in said figure. When this is accomplished the member 73 will be moved upwardly to release the latch or claw 70 so that upon the next forward movement of the pusher only the four bars 47, 54 will advance to contact cans and push them into the form or chamber A, and consequently only the first, third, fifth and seventh cans reading downwardly in the vertically arranged row will be pushed into the receiving chamber, the second, fourth and sixth cans in said row being left in position beside the fixed rail 14. During this feeding of four cans into the form or chamber A the intermediate two pairs 47, 54 will pass between said second, fourth and sixth cans which are being firmly held between the clamp plates 101. By thus pushing seven identical staggered rows of cans into the chamber, followed by an upright row of four cans with their axes in the same vertical plane a can will be presented in each corner of the form as illustrated in Figure 1. This arrangement is also very advantageous in the provision of a compact and stable package of cans, but it is to be understood, however, that this refinement may be dispensed with, if desired, and the tier complement of cans may be formed by the successive feeding of identical rows throughout.

Figure 8:
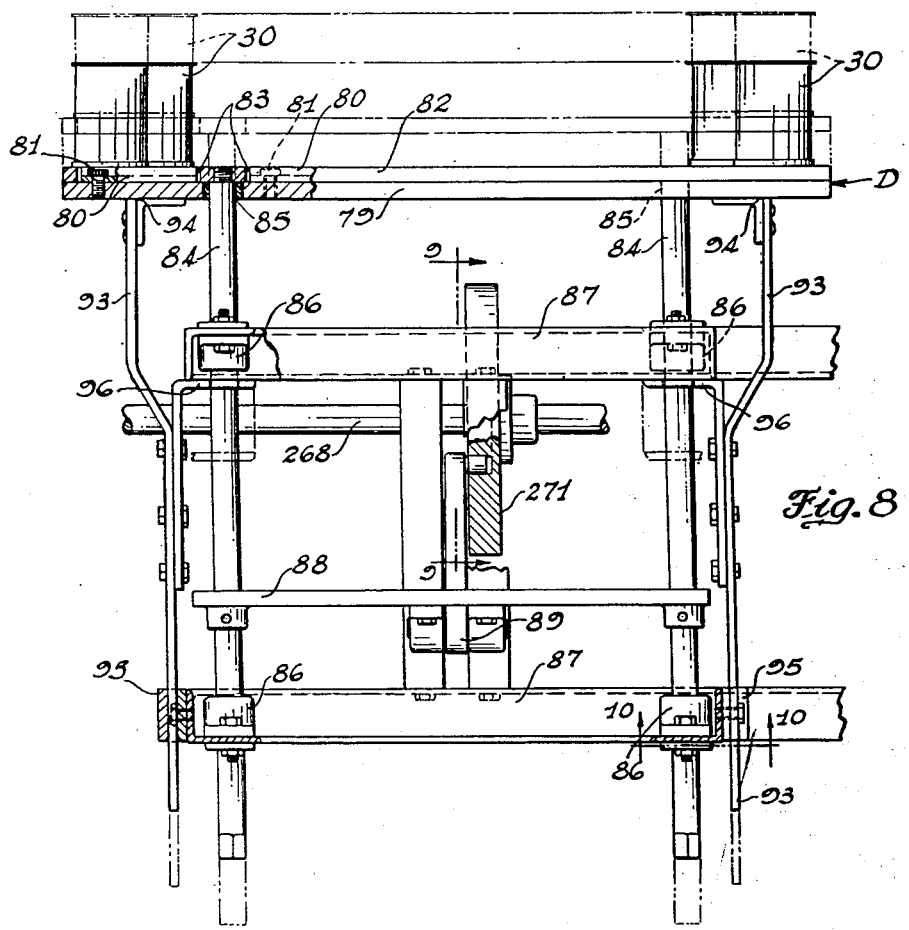
Figure 8 is a fragmentary horizontal section illustrating the mounting of the back plate, the magnets, and the stripper plate, the actuating means for reciprocating this assembly also being shown.
Figure 9:
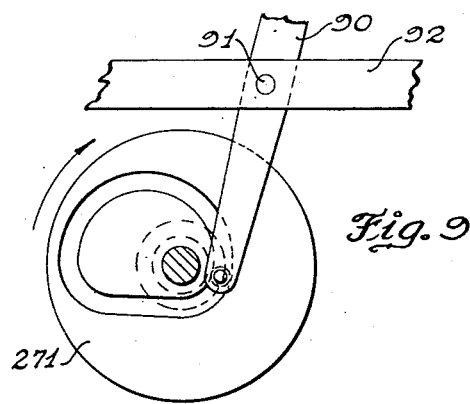
Figure 9 is a fragmentary vertical cross section taken on the line 9—9 on Figure 8 and showing the back plate and stripper plate assembly actuating cam.
Figure 10:
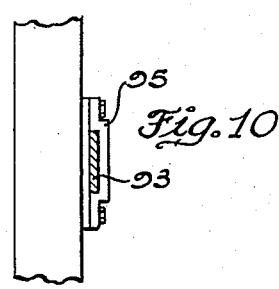
Figure 10 is a fragmentary vertical cross section taken on the line 10—10 on Figure 8.

It is to be assumed that a bag F has been telescoped over the bag form E in the manner illustrated in Figure 2. When a whole tier complement of cans has been arranged as in Figure 1, the cam 276 will have functioned to actuate the thrust link 282 to present and retract the suction cups so that a tier sheet will have been fed into position in front of the bag form and into the sheet edge guides 195 positioned as in Figure 24. With this accomplished, the cam 292 will have actuated the clutch trip lever 297 to initiate a single rotation of the shaft 268 and the cam 271 fixed thereon. This serves to advance and again retract the back plate structure D, the tier complement of cans and the tier sheet above it being pushed into the bag form as the back plate structure is advanced. As before described, during the initial portion of the movement of the back plate structure both plates 79 and 82 move in unison, but before the cans are pushed the full distance into the bag form, movement of the magnet carrying plate 79 will be arrested by the stops 96 so that the continued movement of the plate portion 82 will strip the cans from the magnets as shown in Figure 8.

This cycle of can tier complement arrangement and projection into the bag form is repeated the proper and predetermined number of times to assemble in the bag form the full bag complement of cans, and when this is accomplished, the cam 277 will move the arm 285 and cause the clutch trip lever 290 to initiate a single rotation of the shaft 258. This single rotation of the shaft 258 will cause the cam 261 to bring about a lowering of the bag form E onto the inclined rack shelf 139 to allow the can filled bag to gravitate into the receiver I, and then a lifting of said form to its initial receiving position. The receiver I is then swung up into the position illustrated in dot and dash lines in Figure 14 to present the open top of the bag upwardly so that it can be sealed and removed while repetition of the above described cycle of operations of the machine is in progress.

It is to be understood that the number of cans to be arranged in a tier complement may be varied in accordance with varied packaging practices, and it follows also that the number of tiers of cans to be pushed into the form in making up a bag complement may be varied. The tier sheet feed controlling cam shown in Figure 33 has been illustrated and described as including five projections or nose portions 276 effective to bring about the feeding of a tier sheet each time a nose portion 276 displaces the roller 278 and rocks the shaft 280. It will be apparent, however, that the number of nose portions 276 may be increased or diminished in accordance with the number of can tiers to be pushed into each bag and the planned arrangement of the tier sheets between the tiers of cans. Also, the nose portions may take the form of removable and replaceable dovetail inserts as shown in Figure 33, thereby providing for easy mounting and replacement of the inserts, or the leaving out of an insert whenever desired.

For example, in one practical practice of packaging it was found desirable to make up a bag complement composed of five tiers of cans. According to such practice five tiers of cans would be successively pushed into the swingably mounted form section 109, and a sixth tier complement would remain in the fixed section 108 at the time the section 109 is swung down preparatory to discharging the bag with its complement of five tiers of cans. Should all five nose portions 276 be retained in the cam of Figure 33 a tier sheet would be placed in advance of each tier complement of cans before it is pushed into the form 108, 109.

By removing one of the cam nose portions 276 it is possible to feed a tier sheet into position in front of each of four tier complements of cans before they are pushed into the form 108, 109 and to provide that no tier sheet will be fed into position before each fifth tier complement of cans about to be pushed into said form. In this manner no tier sheet will be placed between the first pushed tier complement of cans and the bottom of the bag into which it is being pushed step-by-step. This serves not only to avoid placement of a tier sheet in the bottom of the bag, but also prevents falling away of a tier sheet from in front of said first pushed tier complement as it is being advanced along the form section 109 toward the bottom of the bag telescoped thereover. It will be apparent that a tier sheet would be fed between the first and second tier complements of cans, between the second and third, third and fourth, and between the fourth and fifth or top tier complement of cans. No tier sheet would be fed behind said fifth or top tier complement of cans, it being preferred that a tier sheet be placed in the top of the bag by hand incidental to the closing and sealing of the bag.

While one form of the invention has been shown for purposes of illustration, it is to be clearly understood that various changes in the details of construction and arrangement of parts may be made without departing from the spirit and scope of the invention as defined in the appended claims.

I claim:

1. In apparatus of the character described, a chamber in which to receive cans in staggered and nested row relation, means for receiving cans and forming them in a staggered row relation, means for directing cans into said row forming means, and means for pushing each row so formed into the chamber to engage in staggered and nested row contact with other can rows in the chamber.

2. In apparatus of the character described, a chamber in which to receive cans in staggered and nested row relation, means for receiving cans and forming them in a staggered row relation, means for directing cans into said row forming means, and means for pushing each row so formed into the chamber to engage in staggered and nested row contact with other can rows in the chamber to make up a tier complement of cans in said chamber, means for holding a bag with an open mouth opposite said chamber, and means for pushing successively made up tier complements of cans into said bag.

3. In apparatus of the character described, a chamber in which to receive cans in staggered and nested row relation, means for receiving cans and forming them in a row relation, means for directing cans into said row forming means, a reciprocable pusher having a can row engaging face of zig-zag shape corresponding to the staggered relation the cans of a row are to assume in said chamber, and means for reciprocating the pusher to cause it to move each successively formed can row into said chamber with the cans thereof staggered to engage in staggered and nested row relation with other can rows in the chamber.

4. In apparatus of the character described, a chamber in which to receive cans in staggered and nested row relation, means for receiving cans and forming them in a row relation, means for directing cans into said row forming means, a reciprocable pusher having a can row engaging face of zig-zag shape corresponding to the staggered relation the cans of a row are to assume in said chamber, and means for reciprocating the pusher to cause it to move each successively formed can row into said chamber with the cans thereof staggered to engage in staggered and nested row relation with other can rows in the chamber to make up a tier complement of cans in said chamber, means for holding a bag with an open mouth opposite said chamber, and means for pushing successively made up tier complements of cans into said bag.

5. Apparatus as defined in claim 3 in which the pusher is formed in separable sections and means is provided for at times rendering the pusher sections selectively movable to push less than a full row of cans into the form, so arranging the lesser number of cans as to assure the placement of cans in the two corners of the chamber adjacent the pusher.

6. Apparatus as defined in claim 3 in which the pusher is formed in separable sections each including a multiple of bars of a size for pushing individual cans and there are included control devices effective to cause all bars to move in unison during the pushing of all can rows into the chamber but the last one necessary to make up a tier complement, and at that time to cause alternate bars only to move and push less than a full row of cans into the form in position for filling out a tier complement of cans in the chamber with a can in each corner of said chamber.

7. Apparatus as defined in claim 1 in which the means for receiving cans and forming them in a staggered row relation comprises a pair of zig-zag rails between which the cans engage, and in which means is included for moving the rail nearest the can receiving chamber out of the way each time a row of cans is pushed into said chamber and for replacing the same in proper cooperative relation to the other rail for receiving and arranging in a staggered row the can row next to be pushed into said chamber.

8. Apparatus as defined in claim 3 in which the pusher includes portions for engaging the cans at widely spaced positions along their length so as to avoid canting of the cans as they are being pushed into the chamber, and in which there are also included devices for yieldably pressing against end portions of the cans to hold them stable as they are being pushed into said chamber.

9. Apparatus as defined in claim 1 in which the means for receiving cans and forming them in a staggered row relation comprises a pair of zig-zag rails between which the cans engage, in which means is included for moving the rail nearest the can receiving chamber out of the way each time a row of cans is pushed into said chamber and for replacing the same in proper cooperative relation to the other rail for receiving and arranging in a staggered row the can row next to be pushed into said chamber, and in which the pusher includes spaced pusher edge portions for engaging the cans at opposite sides of the non-movable rail and at widely spaced positions along the length of the cans.

10. Apparatus as defined in claim 1 in which the means for receiving cans and forming them in a staggered row relation comprises a pair of zig-zag rails between which the cans engage, in which means is included for moving the rail nearest the can receiving chamber out of the way each time a row of cans is pushed into said chamber and for replacing the same in proper cooperative relation to the other rail for receiving and arranging in a staggered row the can row next to be pushed into said chamber, and in which the pusher includes spaced pusher edge portions for engaging the cans at opposite sides of the non-movable rail and at widely spaced positions along the length of the cans, there also being included means for yieldably pressing against ends of the cans as they are being pushed into the chamber and for removing said pressing means from the can end contacting position as cans are moving into position between said rails to be arranged in zig-zag or staggered row relation thereby.

11. Apparatus as defined in claim 1 in which the can directing means includes a guideway and belt means for feeding cans in row relation along the guideway, and in which there are included means for moving the belt out of feeding contact with the cans each time the pushing means advances to push a row of cans into the chamber.

12. In apparatus of the character described, a chamber in which to receive cans in staggered and nested row relation, means for receiving cans and forming them in a staggered row relation, means for directing cans into said row forming means, means for pushing each row so formed into the chamber to engage in staggered and nested row contact with other can rows in the chamber, a backing plate structure in part defining said chamber and disposed to be engaged by can ends as the rows of cans in staggered relation are successively pushed into the chamber, and magnet means on said plate structure for holding the cans in the position in which they are pushed in the chamber.

13. In apparatus of the character described, a chamber in which to receive cans in staggered and nested row relation, means for receiving cans and forming them in a row relation, means for directing cans into said row forming means, a reciprocable pusher having a can row engaging face of zig-zag shape corresponding to the staggered relation the cans of a row are to assume in said chamber, means for reciprocating the pusher to cause it to move each successively formed can row into said chamber with the cans thereof staggered to enage in staggered and nested row relation with other can rows in the chamber, a backing plate structure in part defining said chamber and disposed to be engaged by can ends as the rows of cans in staggered relation are successively pushed into the chamber, and magnet means on said plate structure for holding the cans in the position in which they are pushed in the chamber.

14. In apparatus of the character described, a chamber in which to receive cans in staggered and nested row relation, means for receiving cans and forming them in a row relation, means for directing cans into said row forming means, a reciprocable pusher having a can row engaging face of zig-zag shape corresponding to the staggered relation the cans of a row are to asume in said chamber, and means for reciprocating the pusher to cause it to move each successively formed can row into said chamber with the cans thereof staggered to engage in staggered and nested row relation with other can rows in the chamber to make up a tier complement of cans in said chamber, means for holding a bag with an open mouth opposite said chamber, a backing plate structure in part defining said chamber and disposed to be engaged by can ends as the rows of cans in staggered relation are successively pushed into the chamber, magnet means on said plate structure for holding the cans in the position in which they are pushed in the chamber, means for moving the backing plate structure for pushing successively made up tier complements of cans into said bag, and means effective during the pushing of each tier complement of cans into the bag for freeing the cans from the attraction of the magnet means.

15. In apparatus of the character described, a chamber uprightly disposed and adapted to receive cans in staggered and nested row relation and with their axes horizontally disposed, a backing plate structure disposed in an upright plane and partially defining said chamber, means for receiving cans and forming them in upright row relation with their axes horizontally disposed, a reciprocable pusher having a can row engaging face of zig-zag shape corresponding to the staggered relation the cans of a row are to assume in said chamber, means for reciprocating the pusher to cause it to move each successively formed can row into said chamber with the cans thereof staggered to engage in staggered and nested row relation with other can rows in the chamber to make up a tier complement of cans in said chamber, means for holding a bag with an open mouth opposite said chamber, and means for reciprocating the backing plate structure to push each successively made up tier complements of cans into the bag and then return into position for receiving the can rows during the making up of the next tier complement of cans.

16. Apparatus as defined in claim 15 in which there are included magnet means for holding the cans against the backing plate structure in the staggered and nested row relation in which they are pushed into the chamber and over said plate structure, and means effective during the pushing of each tier complement of cans into the bag for freeing the cans from the attraction of the magnet means.

17. Apparatus as defined in claim 15 in which the can directing means includes an upright guideway through which the cans move by gravity action and which is traversed as a cut-off by the pusher as it moves a row of cans into the chamber.

18. Apparatus as defined in claim 15 in which the can directing means includes an upright guideway through which the cans move by gravity action and which is traversed as a cut-off by the pusher as it moves a row of cans into the chamber, and also a driven belt engaging cans in said guideway and accelerating movement of the cans, there being included also means actuated by the pusher each time it advances to push a row of cans into the chamber to move the belt out of feeding contact with the cans in said guideway.

19. Apparatus as defined in claim 15 in which the pusher is formed in separable sections and means is provided for at times rendering the pusher sections selectively movable to push less than a full row of cans into the form, so arranging the lesser number of cans as to assure the placement of cans in the two corners of the chamber adjacent the pusher, and in which there are also included magnet means for holding the cans against the backing plate structure in the staggered and nested row relation in which they are pushed into the chamber and over said plate structure, and means effective during the pushing of each tier complement of cans into the bag for freeing the cans from the attraction of the magnet means.

20. Apparatus as defined in claim 15 in which the pusher is formed in separable sections each including a multiple of bars of a size for pushing individual cans and there are included control devices effective to cause all bars to move in unison during the pushing of all can rows into the chamber but the last one necessary to make up a tier complement, and at that time to cause alternate bars only to move and push less than a full row of cans into the form in position for filling out a tier complement of cans in the chamber with a can in each corner of said chamber, and in which there are also included magnet means for holding the cans against the backing plate structure in the staggered and nested row relation in which they are pushed into the chamber and over said plate structure, and means effective during the pushing of each tier complement of cans into the bag for freeing the cans from the attraction of the magnet means.

21. Apparatus as defined in claim 15 in which the means for receiving the cans and forming them in upright row relation comprises a pair of zig-zag rails between which the cans engage, and in which there are also included means for holding the cans against the backing plate structure in the staggered and nested row relation in which they are pushed into the chamber and over said plate structure, means effective during the pushing of each tier complement of cans into the bag for freeing the cans from the attraction of the magnet means, and means for moving the rail nearest the can receiving chamber out of the way each time a row of cans is pushed into said chamber and for replacing the same in proper cooperative relation to the other rail for receiving and arranging in a staggered row the can row next to be pushed into said chamber.

22. Apparatus as defined in claim 15 in which the means for receiving the cans and forming them in upright row relation comprises a pair of zig-zag rails between which the cans engage, and in which there are also included means for holding the cans against the backing plate structure in the staggered and nested row relation in which they are pushed into the chamber and over said plate structure, means effective during the pushing of each tier complement of cans into the bag for freeing the cans from the attraction of the magnet means, means for moving the rail nearest the can receiving chamber out of the way each time a row of cans is pushed into said chamber and for replacing the same in proper cooperative relation to the other rail for receiving and arranging in a staggered row the can row next to be pushed into said chamber, and in which the pusher includes spaced pusher edge portions for engaging the cans at opposite sides of the nonmovable rail and at widely spaced portions along the length of the cans, there also being included means for yieldably pressing against ends of the cans as they are being pushed into the chamber and for removing said pressing means from the can end contacting position as cans are moving into position between said rails to be arranged in zig-zag or staggered row relation thereby.

23. In apparatus of the character described, a chamber in which to receive cans in staggered and nested row relation, means for receiving cans and forming them in a row relation, means for directing cans into said row forming means, a reciprocable pusher having a can row engaging face of zig-zag shape corresponding to the staggered relation the cans of a row are to assume in said chamber, and means for reciprocating the pusher to cause it to move each successively formed can row into said chamber with the cans thereof staggered to engage in staggered and nested row relation with other can rows in the chamber to make up a tier complement of cans in said chamber, means for holding a bag with an open mouth opposite said chamber, a backing plate structure in part defining said chamber and disposed to be engaged by can ends as the rows of cans in staggered relation are successively pushed into the chamber, magnet means on said plate structure for holding the cans in the position in which they are pushed in the chamber, said backing plate structure including a back plate portion on which the magnet means are mounted and a front plate portion which is apertured to permit said magnet means to project therethrough into position for magnetically attracting cans and holding them against said front plate portion, means for moving the backing plate structure for pushing successively made up tier complements of cans into said bag and including devices for causing said back plate portion and said front plate portion to move in unison during the initial part of the movement of each can tier complement into the bag and for causing the front plate portion to move ahead of the back plate portion in completing the pushing of each tier complement into the bag, thereby to strip said tier complement of cans from the magnet means.

24. In apparatus of the character described, a chamber in which to receive cans in staggered and nested row relation, means for receiving cans and forming them in a row relation, means for directing cans into said row forming means, a reciprocable pusher having a can row engaging face of zig-zag shape corresponding to the staggered relation the cans of a row are to assume in said chamber, and means for reciprocating the pusher to cause it to move each successively formed can row into said chamber with the cans thereof staggered to engage in staggered and nested row relation with other can rows in the chamber to make up a tier complement of cans in said chamber, means for holding a bag with an open mouth opposite said chamber, means for feeding a tier sheet into place opposite the open mouth of the bag in timed relation to the making up of the tier complements of cans, and means for pushing successively made up tier complements of cans and tier sheets into the bag with the sheets disposed as separators between tier complements of cans.

25. In apparatus of the character described, a chamber in which to receive cans in staggered and nested row relation, means for receiving cans and forming them in a row relation, means for directing cans in to said row forming means, a reciprocable pusher having a can row engaging face of zig-zag shape corresponding to the staggered relation the cans of a row are to assume in said chamber, and means for reciprocating the pusher to cause it to move each successively formed can row into said chamber with the cans thereof staggered to engage in staggered and nested row relation with other can rows in the chamber to make up a tier complement of cans in said chamber, means for holding a bag with an open mouth opposite said chamber, means for feeding a tier sheet into place opposite the open mouth of the bag in timed relation to the making up of the tier complements of cans, edge guides for receiving and holding the sheets in place opposite the open bag mouth, means for pushing successively made up tier complements of cans and tier sheets into the bag with the sheets disposed as separators between tier complements of cans, and means for vibrating said guides in timed relation to the feeding of sheets and the pushing of can tier complements into the bag to place the guides for receiving the sheets as they are fed and to displace the guides during said pushing of can tier complements of cans into the bag.

26. Apparatus as defined in claim 24 in which the tier sheet feeding means includes a tier sheet pack support, an oscillating suction cup carrier alternately engageable with the sheet pack and movable away to grip and pull away individual tier sheets, continuously driven feed rolls, guides disposed to guide sheets to said rolls, valve means including a valve member movable with the cup carrier and effective to open communication between the suction cups and a suction source as the cups are engaged with the sheet pack and to open communication between said cups and atmosphere as the cups grip and take each sheet away from the pack and over the guides, and kicker rollers movable into contact with the outermost sheet of the pack as it is being moved away by the cups to be effective as the cup grip is released to kick said sheet into the guides to be fed by the feed rolls.

27. In apparatus of the character described, a chamber uprightly disposed and adapted to receive multiple upright rows of cans to form a tier complement with the can axes horizontally disposed, a backing plate disposed in an upright plane and partially defining said chamber, means for receiving cans and forming them in upright row relation with their axes horizontally disposed, a reciprocable pusher, means for reciprocating the pusher to move successively formed upright can rows into said chamber, a bag form over which a bag may be telescoped to present its open mouth opposite the chamber, means for reciprocating the backing plate to push each successively made up tier complement of cans into the bag, a supporting rack having an inclined shelf portion, means swingably supporting the bag form for movement between a horizontal can tier complement receiving position and a position on said shelf in which filled bags of cans are discharged therefrom, and means operable in timed relation to said pusher and said backing plate for lowering the bag form onto said shelf after the receiving in said form and bag of each bag complement of cans and then again lifting the same to its can tier complement receiving position.

28. Apparatus as defined in claim 27 in which there are included clamping means for clamping bags against the sides of the swingably mounted bag form, and control devices effective to cause the clamping means to clamp a bag against the form while it is being moved downwardly to the discharging position and for moving said clamping means away from the form when the form is at said receiving and discharging positions to permit telescoping of a bag over the form or the movement of the bag off the form and down the shelf incline.

29. Apparatus as defined in claim 27 in which there are included clamping means for clamping bags against the sides of the swingably mounted bag form, and control devices effective to cause the clamping means to clamp a bag against the form while it is being moved downwardly to the discharging position and for moving said clamping means away from the form when the form is at said receiving and discharging positions to permit telescoping of a bag over the form or the movement of the bag off the form and down the shelf incline, said clamping means including rubber faced pivotally mounted clamp plates each including a leaf spring so disposed with relation to the plate pivot as to engage the bag adjacent its open mouth as the plate is being moved into clamping engagement therewith in a direction for drawing the bag tightly onto the form.

30. Apparatus as defined in claim 27 in which the supporting rack includes a pivotally mounted bag receiver disposed to receive the filled bags as they are slid down the inclined shelf off the bag form and which is swingable to an upright position for presenting the open top of the filled bag upwardly in a manner for facilitating sealing thereof.

HERBERT SCHRADER.

No references cited.